US010242471B2

(12) United States Patent
Demiralp et al.

(10) Patent No.: US 10,242,471 B2
(45) Date of Patent: *Mar. 26, 2019

(54) RENDERING INTERACTION STATISTICS DATA FOR CONTENT ELEMENTS OF AN INFORMATION RESOURCE BY IDENTIFYING CLIENT DEVICE SEGMENTS

(71) Applicant: Google Inc., Mountain View, CA (US)

(72) Inventors: Emre Demiralp, San Francisco, CA (US); Tommaso Francesco Bersano-Begey, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/716,113

(22) Filed: Sep. 26, 2017

(65) Prior Publication Data

US 2018/0068472 A1 Mar. 8, 2018

Related U.S. Application Data

(63) Continuation of application No. 15/137,898, filed on Apr. 25, 2016, now Pat. No. 9,799,131.

(51) Int. Cl.
*G06F 17/30* (2006.01)
*G06Q 30/02* (2012.01)
(Continued)

(52) U.S. Cl.
CPC .......... *G06T 11/206* (2013.01); *G06F 3/0481* (2013.01); *G06F 17/3089* (2013.01);
(Continued)

(58) Field of Classification Search
None
See application file for complete search history.

(56) References Cited

U.S. PATENT DOCUMENTS 7,165,105 B2 1/2007 Reiner et al.
7,644,375 B1 1/2010 Anderson et al.
(Continued)

FOREIGN PATENT DOCUMENTS

EP 2 704 037 A2 3/2014

OTHER PUBLICATIONS

Anonymous: "Event Tracking in Google Analytics Explained for Non-Coders," Aug. 15, 2013, XP055384807, Retrieved from the Internet: URL:http://www.seerinterative.com/blog/event-tracking-explained/, retrieved on Jun. 23, 2017, pp. 1-4.
(Continued)

*Primary Examiner* — Kee M Tung
*Assistant Examiner* — Yanna Wu
(74) *Attorney, Agent, or Firm* — Foley & Lardner LLP

(57) ABSTRACT

Systems and methods of rendering webpage interaction statistics data over graphical user interfaces is provided herein. A computing device can transmit a request for an interaction statistics identifying an information resource. The computing device can receive the interaction data set for the identified information resource. The computing device can calculate a similarity measure among the client devices based on the interaction data set using a clustering algorithm. The computing device can identity a subset of client devices based on the similarity measure. The computing device can calculate the interaction sequence metrics for the client devices for each selected content element. The computing device can select the content elements based on the calculated interaction sequence metrics. The computing device can generate a graph element including nodes representing each selected content element and paths representing the interaction sequence metrics. The computing device can display the graph element.

20 Claims, 10 Drawing Sheets

(51) Int. Cl.
  *G06T 11/20* (2006.01)
  *G06T 11/60* (2006.01)
  *H04L 29/06* (2006.01)
  *H04L 29/08* (2006.01)
  *G06F 3/0481* (2013.01)

(52) U.S. Cl.
  CPC ... *G06F 17/30716* (2013.01); *G06Q 30/0241* (2013.01); *G06T 11/60* (2013.01); *H04L 67/06* (2013.01); *H04L 67/42* (2013.01)

(56) References Cited

U.S. PATENT DOCUMENTS

| | | | |
|---|---|---|---|
| 8,296,666 | B2 | 10/2012 | Wright et al. |
| 8,606,912 | B1 | 12/2013 | Moon |
| 8,689,108 | B1 | 4/2014 | Duffield et al. |
| 8,812,960 | B1 | 8/2014 | Sun et al. |
| 2007/0005481 | A1 | 1/2007 | Kedia et al. |
| 2008/0046562 | A1 | 2/2008 | Butler |
| 2008/0181463 | A1 | 7/2008 | Error |
| 2008/0184129 | A1 | 7/2008 | Cancel et al. |
| 2009/0037579 | A1 | 2/2009 | Error et al. |
| 2012/0233090 | A1 | 9/2012 | Tavares et al. |
| 2013/0031470 | A1 | 1/2013 | Daly et al. |
| 2013/0166375 | A1 | 6/2013 | Younglincoln |
| 2014/0033007 | A1 | 1/2014 | Mhatre |
| 2014/0095257 | A1 | 4/2014 | Lewis et al. |
| 2014/0143652 | A1 | 5/2014 | Deloach et al. |
| 2014/0267290 | A1 | 9/2014 | Hao et al. |
| 2015/0205887 | A1 | 7/2015 | Freund et al. |
| 2016/0188552 | A1 | 6/2016 | Wang et al. |

OTHER PUBLICATIONS

Hochheiser et al., "Using Interactive Visualization of WWW Log Data to Characterize Access Patterns and Inform Site Design," 2001.
International Search Report and Written Opinion for Application No. PCT/US2017/028969 dated Jul. 20, 2017.
International Search Report and Written Opinion for Application No. PCT/US2017/028973, dated Jun. 19, 2017.
International Search Report and Written Opinion for Application No. PCT/US2017/028975, dated Jul. 4, 2017.
Magdalini Eirinaki et al., "Web Mining for Web Personalization," ACM Transactions on the Internet Technology, ACM, New York, NY, US, vol. 3, No. 1, Feb. 1, 2003, pp. 1-27.
U.S. Notice of Allowance on U.S. Appl. No. 15/137,898 dated Jun. 16, 2017.
U.S. Office Action on U.S. Appl. No. 15/137,884 dated Apr. 19, 2017.
U.S. Office Action on U.S. Appl. No. 15/137,884 dated Jun. 21, 2017.
U.S. Office Action on U.S. Appl. No. 15/137,898 dated Apr. 14, 2017.
Magdalini Eirinaki et al: "Web mining for web personalization", ACM Transactions on Internet Technology, ACM, New York, NY, US, vol. 3, No. 1, Feb. 1, 2003 (3003-02-01), pp. 1-27, XP058245886, ISSN: 1533-5399, DOI: 10.1145/643477.643478.
Notification of Transmittal of the International Preliminary Report on Patentability, re PCT/2017/028975 dated Jul. 2, 2018.
U.S. Office Action on U.S. Appl. No. 15/137,864 dated Apr. 6, 2018.
International Preliminary Report on Patentability, PCT/US2017/028973, 7 pages, dated Nov. 8, 2018.
Notice of Allowance on U.S. Appl. No. 15/137,864 dated Oct. 3, 2018.

RENDERING INTERACTION STATISTICS DATA FOR CONTENT ELEMENTS OF AN INFORMATION RESOURCE BY IDENTIFYING CLIENT DEVICE SEGMENTS

CROSS-REFERENCE TO RELATED PATENT APPLICATION

The present application is a continuation of and claims priority to U.S. patent application Ser. No. 15/137,898, entitled "RENDERING INTERACTION STATISTICS DATA FOR CONTENT ELEMENTS OF AN INFORMATION RESOURCE BY IDENTIFYING CLIENT DEVICE SEGMENTS", filed Apr. 25, 2016, which is incorporated herein by reference in its entirety.

BACKGROUND

In a computer networked environment such as the Internet, entities such as people or companies provide information for public display on web pages or other online documents. The documents can include information provided by the entities via a computing device for display on the Internet. Content can also be provided by other entities for display on the documents together with the information provided by the entities. Thus, a user viewing a document can access the information that is the subject of the document, as well as third party content that may or may not be related to the subject matter of the document.

SUMMARY

At least one aspect is directed to a method of rendering Internet interaction statistical data on graphical user interfaces. A resource request module executing a computing device having one or more processors can transmit, via a network interface of the computing device, a request for interaction statistics for an information resource to a data processing system. The request for interaction statistics can identify the information resource. The resource request module can receive, via the network interface, from a log database of the data processing system, an interaction dataset for the information resource, the information resource can include a first content element and a second element. The interaction dataset can include a first number of interactions by a plurality of client devices with the first content element prior to interacting with the second content element, a second number of interactions by the plurality of client devices with the second content element prior to interacting with the first content element, a first time duration for interacting with the first content element by each of the plurality of client devices, and a second time duration for interacting with the second content element by each of the plurality of client devices. A clustering module executing on the computing device can calculate, using a clustering algorithm, a similarity measure among a subset of client devices from the plurality of client devices based on the first number of interactions, the second number of interactions, the first time duration, and the second time duration. The clustering module can identify, using the clustering algorithm, the subset of client devices from the plurality of client devices based on the similarity measure. The metric calculator module can calculate a first interaction sequence metric for interactions by the subset of client devices with the first content element prior to interacting with the second content element on the information resource based on the corresponding first number of interactions and the first corresponding time duration for the subset of client devices. The metric calculator module can calculate a second interaction sequence metric for interactions by the subset of client devices with the second content element prior to interacting with the first content element on the information resource based on the corresponding second number of interactions and the corresponding second time duration for the subset of client devices. The metric calculator can select the first content element and the second content element based on the first interaction sequence metric and the second interaction sequence metric. A graph generator module executing on the computing device can generate a graph element. The graph element can include a first node corresponding to the first content element, a second node corresponding to the second content element, a first directed path from the first node to the second node indicating the first interaction sequence metric for the interactions by the subset of client devices with the first content element prior to interacting with the second content element, and a second directed path from the second node to the first node indicating the second interaction sequence metric for the interactions by the subset of client devices with the second content element prior to interacting with the first content element. A rendering engine executing on the computing device can display the graph element in a graphical user interface.

In some implementations, the clustering module can calculate, using the clustering algorithm, a second similarity measure among a second subset of client devices from the plurality of client devices based on the first number of interactions, the second number of interactions, the first time duration, and the second time duration. In some implementations, the clustering module can identify the second subset of client devices from the plurality of client devices based on the second similarity measure. In some implementations, the clustering module can identify the second subset of client devices from the plurality of client devices based on the second similarity measure. In some implementations, the metric calculator module can calculate a third interaction sequence metric for interactions by the second subset of client devices with the first content element prior to interacting with the second content element on the information resource based on the corresponding first number of interactions and the corresponding time duration for the second subset of client devices. In some implementations, the metric calculator module can calculate a fourth interaction sequence metric for interactions by the second subset of client devices with the second content element prior to interacting with the first content element on the information resource based on the corresponding second number of interactions and the corresponding second time duration for the second subset of client devices. In some implementations, the metric calculator module can determine a first interaction sequence difference measure based on the first interaction sequence metric and the third interaction sequence metric. In some implementations, the metric calculator module can determine a second interaction sequence difference measure based on the second interaction sequence metric and the fourth interaction sequence metric. In some implementations, wherein generating the graph element can further include generating the graph element including a third directed path indicating the first interaction sequence difference measure and a fourth directed path indicating the second interaction sequence difference measure.

In some implementations, the metric calculator module can calculate a first number of time intervals between the interactions by the subset of client devices with the first content element prior to interacting with the second content element based on the corresponding first time duration for the subset of client devices. In some implementations, the medic calculator module can calculate a second number of time intervals between the interactions by the subset of client devices with the second element prior to interacting with the first content element based on the corresponding second time duration for the subset of client devices. In some implementations, generating the graph element can further include generating the graph element including a first directed loop from and to the first content element indicating the first number of time intervals between the interactions by the subset of client devices with the first content element prior to interacting with the second content element and a second directed loop from and to the second content element indicating the second number of time intervals between the interactions by the subset of client devices with the second content element prior to interacting with the first content element.

In some implementations, calculating the first interaction sequence medic can further include calculating a first conditional probability based on the corresponding first number of interactions for the subset of client devices and a total number of interactions by the subset of client devices on the first content element and the second content element. In some implementations, calculating the first interaction sequence metric can further include calculating a first time metric based on the corresponding first time duration by the subset of client devices on the first content element. In some implementations, calculating the first interaction sequence metric can further include adjusting the first conditional probability by the first time metric. In some implementations, calculating the second interaction sequence metric can further include calculating a second conditional probability based on the corresponding second number of interactions for the subset of client devices and a total number of interactions by the subset of client devices on the first content element and the second content element. In some implementations, calculating the second interaction sequence metric can further include calculating a second time metric based on the corresponding first time duration by the subset of client devices on the second content element. In some implementations, calculating the second interaction sequence metric can further include adjusting the second conditional probability by the second time metric.

In some implementations, receiving the interaction dataset can further include receiving the interaction dataset including client device attribute information for each of the plurality of client devices. In some implementations, calculating the similarity measure can further include calculating the similarity measure based on the client device attribute information for each of the plurality of client devices.

In some implementations, the clustering module can compare a number of the subset of client devices to a threshold number, responsive to identifying the subset of client devices. In some implementations, calculating the first interaction sequence metric can further include calculating the first interaction sequence metric, responsive to determining that the number of the subset of client device is greater than the threshold number. In some implementations, calculating the second interaction sequence metric further comprises calculating the second interaction sequence metric, responsive to determining that the number of subset of client devices is greater than the threshold.

In some implementations, the metric calculator module can compare the first interaction sequence metric, the second interaction sequence metric, and a third interaction sequence metric for a third content element of the information resource. The third interaction sequence metric calculated can be based on a third number of interactions by the subset of client devices prior to interacting with the first content element or the second content element and a third time duration for interacting with the third content element by each of the subset of client devices. In some implementations, selecting the first content element and the second content element can further include selecting the first content element and the second content element based on determining that the first interaction sequence metric and the second interaction sequence metric are each greater than the third interaction sequence metric by at least a predefined margin.

In some implementations, receiving the interaction dataset can further include receiving the interaction dataset at a predefined time interval. In some implementations, calculating the first interaction sequence metric can further include calculating the first interaction sequence metric at the predefined time interval, responsive to receiving the interaction dataset. In some implementations, calculating the second interaction sequence metric can further include calculating the second interaction sequence metric at the predefined time interval, responsive to receiving the interaction dataset. In some implementations, generating the graph element can further include generating the graph element at the predefined time interval.

In some implementations, receiving the interaction dataset can further include receiving the interaction dataset including a first identifier for the first content element and a second identifier for the second content element. In some implementations, generating the graph element can further include inserting a first text element positioned on the first node corresponding to the first content element, the first text element including the first identifier. In some implementations, generating the graph element can further include inserting a second text element position on the second node corresponding to the second content element, the second text element including the second identifier.

In some implementations, the metric calculator module can compare the first interaction sequence metric to the second interaction sequence metric. In some implementations, the graph generator module can set the first directed path to a first visual property. In some implementations, the graph generator module can set the second directed path to a second visual property different from the first visual property, responsive to determining that the first interaction sequence metric is different from the second interaction sequence metric by at least 1 predetermined margin.

At least one aspect is directed to a system for rendering Internet interaction statistical data on graphical user interfaces. The system can include a resource request module executed on a computing device having one or more processors. The resource request module can transmit, via a network interface of the computing device, a request for interaction statistics for an information resource to a data processing system. The request for interaction statistics can identify the information resource. The resource request module can receive, via the network interface, from a log database of the data processing system, an interaction dataset for the information resource including a first content element and a second content element. The interaction dataset can include a first number of interactions by a plurality of client devices with the first content element prior to interacting with the second content element, a second number of interactions by the plurality of client devices with the second content element prior to interacting with the first content element, a first time duration for interacting with the first content element by each of the plurality of client devices, and a second time duration for interacting with the second content element by each of the plurality of client devices. A clustering module executed on the computing device can calculate, using a clustering algorithm, a similarity measure among n subset of client devices from the plurality of client devices based on the first number of interactions, the second number of interactions, the first time duration, and the second time duration. The clustering module can identify, using the clustering algorithm, the subset of client devices from the plurality of client devices based on the similarity measure. A metric calculator module executed on the computing device can calculate a first interaction sequence metric for interactions by the subset of client devices with the first content element prior to interacting with the second content element on the information resource based on the corresponding first number of interactions and the corresponding first time duration for the subset of client devices. The metric calculator module can calculate a second interaction sequence metric for interactions by the subset of client devices with the second content element prior to interacting with the first content element on the information resource based on the corresponding second number of interactions and the corresponding second time duration for the subset of client devices. The metric calculator module can select the first content element and the second content element based on the first interaction sequence metric and the second interaction sequence metric. A graph generator module executed on the computing device can generate a graph element. The graph element can include a first node corresponding to the first content element, a second node corresponding to the second content element, a first directed path from the first node to the second node indicating the first interaction sequence metric for the interactions by the subset of client devices with the first content element prior to interacting with the second content element, and a second directed path from the second node to the first node indicating the second interaction sequence metric for the interactions by the subset of client devices with the second content element prior to interacting with the first content element. A rendering engine executed on the computing device can display the graph element in a graphical user interface.

In some implementations, the clustering module can calculate, using the clustering algorithm, a second similarity measure among a second subset of client devices from the plurality of client devices based on the first number of interactions, the second number of interactions, the first time duration, and the second time duration. In some implementation, the clustering module can identify the second subset of client devices from the plurality of client devices based on the second similarity measure. In some implementations, the metric calculator module can calculate a third interaction sequence metric for interactions by the second subset of client devices with the first content element prior to interacting with the second content element on the information resource based on the corresponding first number of interactions and the corresponding first time duration for the second subset of client devices. In some implementations, the metric calculator module can calculate a fourth interaction sequence metric for interactions by the second subset of client devices with the second content element prior to interacting with the first content element on the information resource based on the corresponding second number of interactions and the corresponding second time duration for the second subset of client devices. In some implementations, the metric calculator module can determine a first interaction sequence difference measure based on the first interaction sequence metric and the third infraction sequence metric. In some implementations, the metric calculator module can determine a second interaction sequence difference measure based on the second interaction sequence metric and the fourth interaction sequence metric. In some implementations, the graph generator module can generate a third directed path indicating the first interaction sequence difference measure and a fourth directed path indicating the second interaction sequence difference measure.

In some implementations, the metric calculator module can calculate a first number of time intervals between the interactions by the subset of client devices with the first content element prior to interacting with the second content element based on the corresponding first time duration for the subset of client devices. In some implementations, the metric calculator module can calculate a second number of time intervals between the interactions by the subset of client devices with the second content element prior to interacting with the first content element based on the corresponding second time duration for the subset of client devices. In some implementations, the graph element can include a first directed loop from and to the first content element indicating the first number of time intervals between the interactions by the subset of client devices with the first content element prior to interacting with the second content element. In some implementations, the graph element can include a second directed loop from and to the second content element indicating the second number of time intervals between the interactions by the subset of client devices with the second content element prior to interacting with the first content element.

In some implementations, the metric calculator module can calculate a first conditional probability based on the corresponding first number of interactions for the subset of client devices and a total number of interactions by the subset of client devices on the first content element and the second content element. In some implementations, the metric calculator module can calculate a first time metric based on the corresponding first time duration by the subset of client devices on the first content element. In some implementations, the metric calculator module can adjust the first conditional probability by the first time metric. In some implementations, the metric calculator module can calculate a second conditional probability based on the corresponding second number of interactions for the subset of client devices and a total number of interactions by the subset of client devices on the first content element and the second content element. In some implementations, the metric calculator module can calculate a second time metric based on the corresponding first time duration by the subset of client devices on the second content element. In some implementations, the metric calculator module can adjust the second conditional probability by the second time metric.

In some implementations, the resource request module can receive the interaction dataset including client device attribute information for each of the plurality of client devices. In some implementations, the clustering module can calculate the similarity measure based on the client device attribute information for each of the plurality of client devices.

In some implementations, the clustering module can compare a number of the subset of client devices to a threshold number, responsive to identifying the subset of client devices. In some implementations, the clustering module can calculate the first interaction sequence metric, responsive to determining that the number of the subset of client device is greater than the threshold number. In some implementations, the clustering module can calculate the second interaction sequence metric, responsive to determining that the number of subset of client devices is greater than the threshold.

In some implementations, the metric calculator module can compare the first interaction sequence metric, the second interaction sequence metric, and a third interaction sequence metric for a third content element of the information resource. The third interaction sequence metric calculated can be based on a third number of interactions by the subset of client devices prior to interacting with the first content element or the second content element and a third time duration for interacting with the third content element by each of the subset of client devices. In some implementations, the metric calculator module can select the first content element and the second content element based on determining that the first interaction sequence metric and the second interaction sequence metric are each greater than the third interaction sequence metric by at least a predefined margin.

In some implementations, the resource request module can receive the interaction dataset at a predefined time interval. In some implementations, the metric calculator module can calculate the first interaction sequence metric at the predefined time interval, responsive to receiving the interaction dataset. In some implementations, the metric calculator module can calculate the second interaction sequence metric at the predefined time interval, responsive to receiving the interaction dataset. In some implementations, the graph generator module can generate the graph element at the predefined time interval.

In some implementations, the resource request module can receive the interaction dataset including a first identifier for the first content element and a second identifier for the second content element. In some implementations, the graph generator module can insert a first text element positioned on the first node corresponding to the first content element, the first text element including the first identifier. In some implementations, the graph generator module can insert a second text element position on the second node corresponding to the second content element, the second text element including the second identifier.

In some implementations, the metric calculator module can compare the first interaction sequence metric to the second interaction sequence metric. In some implementations, the graph generator module can set the first directed path to a first visual property. In some implementations, the graph generator module can set the second directed path to a second visual property different from the first visual property, responsive to determining that the first interaction sequence metric is different from the second interaction sequence metric by al least a predetermined margin.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
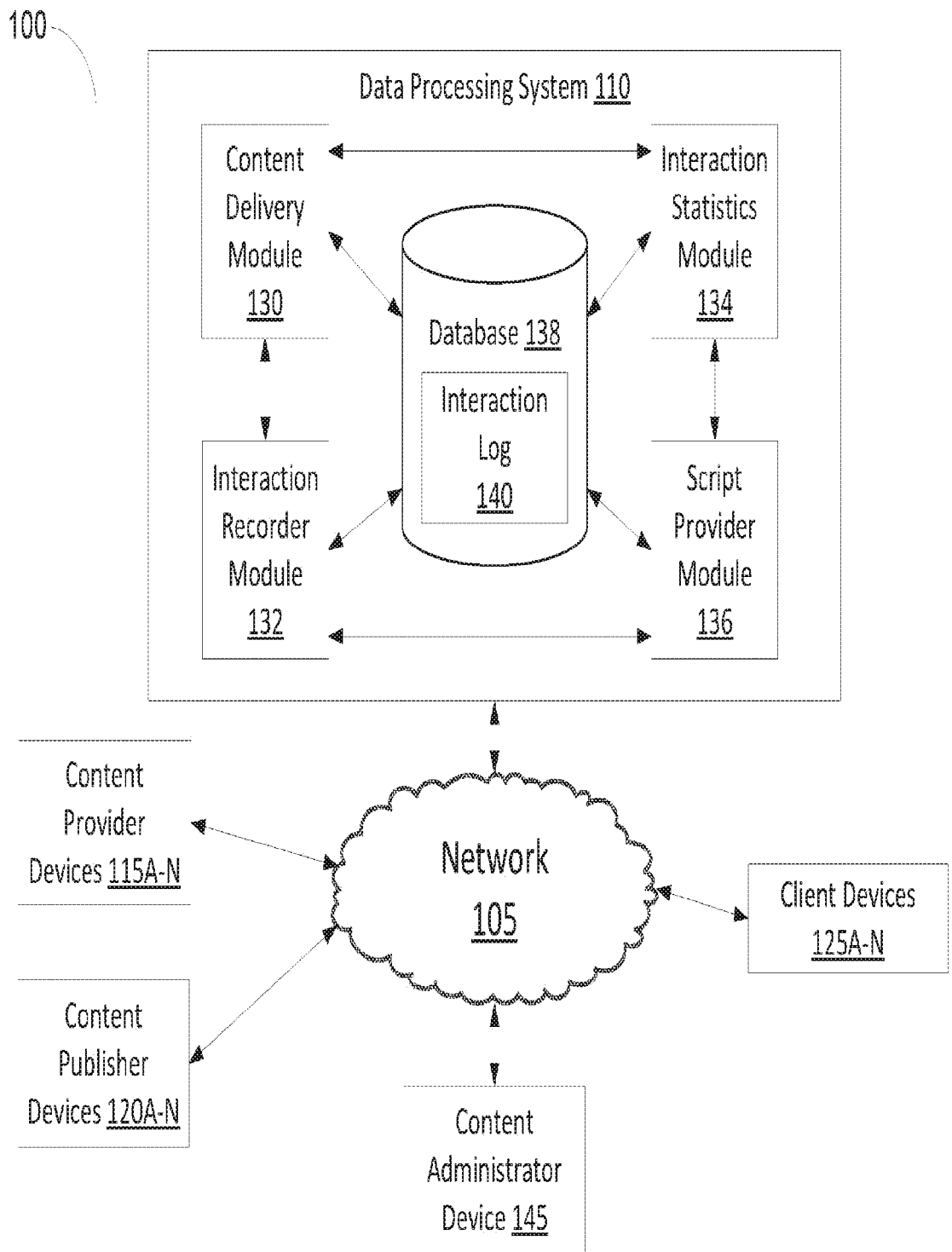
FIG. 1 is a block diagram depicting an environment for rendering webpage interaction statistics data over graphical user interfaces in a computer network environment, according to an illustrative implementation.

Following below are more detailed descriptions of various concepts related to, and implementations of, methods, apparatuses, and systems of rendering webpage interaction statistics data over graphical user interfaces in a computer network environment. The various concepts introduced above and discussed in greater detail below may be implemented in any of numerous ways, as the described concepts are not limited to any particular manner of implementation.

In a computer networked environment, servers may log a myriad of interactions within an information resource (e.g., webpage) by visiting client devices, as an event handler for a respective content element on the information resource is triggered. The multitude of recorded interactions may be used to measure the performance statistics of the information resource itself and the various content elements therein. One challenge in making use of these performance statistics, however, is in processing and presenting them to allow a user to easily digest such statistics in a single viewable frame.

To address these and other challenges, the present disclosure is generally directed to systems and methods of rendering webpage interaction statistics data over graphical user interfaces. In brief overview, a computing device may calculate interaction statistics from the logged interactions and generate a graph or map including the interaction statistics depicting how various client devices interact with one content element on the information resource before interacting with another content element on the same information resource.

In one implementation, a computing device can retrieve the logged interaction data for a given information resource from a database. Each entry of the logged interaction data may include an interaction, a client device identifier, a time duration, and a content element identifier. Using the logged interaction data, the computing device can calculate the number of interactions for each content element on the information resource and the average time duration across all the client devices for each content element. The computing device can then select the top-n content elements with the highest number of interactions. The computing device can determine the flow or sequence of client devices from each content element to another. For example, some client devices may have hover over an image on the webpage before clicking on a textbox, while other client devices may have clicked on the textbox and then hovered over the image.

The computing device can also apply a clustering algorithm to identity client device interaction segments from the interactions, the time duration, and the content element indicated in the logged interaction data. For example, some client devices may be more likely to have interacted with a button on the webpage, whereas other client devices may be more likely to have interacted with a video on the webpage. Examples of a clustering algorithm may include k-nearest neighbors (KNN) algorithm, principal component analysis (PCA), and linear discriminant analysis (LDA), among others. The computing device can then select one of the identified client device segments for further processing.

Using the logged interaction data for the top-n content elements with the highest number of interactions for the particular segment, the computing device can calculate various interaction statistics. The calculated interaction statistics can include, for example, a number of clicks, a click-through rate, a number of hover-overs, a number of impressions, et cetera in relation to the flow or sequence of client devices interacting one content element prior to interacting with another. To depict the interaction statistics in context of the various content elements of the information resource, the computing device can generate a graph (e.g., directed, acyclical) including nodes and edges. Each node may represent a content element on the information resource. Each edge of the graph may represent a flow or sequence of client devices interacting with one content element prior to interacting with another content element on the information resource. The nodes or the edges of the graph may have different visual properties based on the interaction statistics. For example, edges corresponding to higher interaction statistics may be bolded relative to edges associated with lower interaction statistics, the computing device may apply any number of path finding algorithms to generate the graph with content elements, flow of sequence of interactions, and the interaction statistics as parameters.

Once processed and generated, an application (e.g., web browser) of the computing device can display the graph. In some implementations, the computing device can store the graph and transmit a file containing instructions for rendering the graph to another computing device, responsive to a request for the graph. Generating and displaying the graph in the prescribed manner may allow the computing device to present such interaction statistical data without interfering the behavior of the content elements or the information resource. In addition, from a human-computer interaction (HCI) perspective, the graph allows users of the graphical interface of the application to simultaneously view the interaction statistics along with the contents of the information resource.

FIG. 1 is a block diagram depicting an environment for rendering webpage infraction statistics data over graphical user interfaces on communication devices in a computer network environment, according to one illustrative implementation. The environment 100 includes at least one data processing system 110. Although only one data processing system 110 is illustrated, in many implementations, data processing system 110 may be a farm, cloud, cluster, or other grouping of multiple data processing systems or computing devices. The data processing system 110 can include at least one processor and a memory, sometimes referred to as a processing circuit, each of which are discussed in more detail below in connection with FIG. 5. The memory stores processor-executable instructions that, when executed by processor, cause the processor to perform one or more of the operations described herein. The processor may include a microprocessor, application-specific integrated circuit (ASIC), field-programmable gale array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 1 to of the system 100 can communicate via the network 105, for instance with at least one content provider device 115A-N, at least one content publisher device 120A-N, or at least one client device 125A-N. The network 105 may be any form of computer network that relays information between the content provider device 115A-N, data processing system 110, content administrator device 145 and one or more content sources, for example, web servers, advertising servers, among others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider devices 115A-N can include servers or other computing devices operated by a content provider entity to provide content elements for display on information resources at the client device 125A-N. The content provided by the content provider device 115A-N can include third party content elements or creatives (e.g., ads) for display on information resources, such as a website or web page that includes primary content, e.g., content provided by the content publisher devices 120A-N. The content elements can also be displayed on a search results web page. For instance, the content provider computing device 115 can provide or be the source of ads or other content elements for display in content slots of content web pages, such as a web page of a company where the primary content of the web page is provided by the company, or for display on a search results landing page provided by a search engine. The content elements associated with the content provider device 115A-N can be displayed on information resources other than web pages, such as content displayed as part of the execution of an application on a smartphone or other client device 125A-N.

The content publisher devices 120A-N can include servers or other computing devices operated by a content publishing entity to provide primary content for display via the network 105. For instance, the content publisher devices 120A-N can include a web page operator who provides primary content for display on the web page. The primary content can include content other than that provided by the content publisher devices 120A-N, and the web page can include content slots configured for the display of content elements from the content provider devices 115A-N. For instance, the content publisher devices 120A-N can operate the website of a company and can provide content about that company for display on web pages of the website. The web pages can include content slots configured for the display of third party content elements of the content provider computing device 115. In some implementations, the content publisher devices 120A-N includes a search engine computing device (e.g., server) of a search engine operator that operates a search engine website. The primary content of search engine web pages (e.g., a results or landing web page) can include results of a search as well as third party content elements displayed in content slots such as content elements from the content provider device 115A-N.

The client devices 125A-N and the content administrator device 145 can include computing devices configured to communicate via the network 105 to display data such as the content provided by the content publisher devices 120A-N (e.g., primary web page content or other information resources) and the content provided by the content provider computing device 115 (e.g., third party content elements configured for display in a content slot of a web page). The client device 125, the content provider devices 115A-N, the content publisher devices 120A-N, and the content administrator device 145 can include desktop computers, laptop computers, tablet computers, wearable computers, smartphones, personal digital assistants, mobile devices, consumer computing devices, servers, clients, digital video recorders, a set-top box for a television, a video game console, or any other computing device configured to communicate via the network 105. The client devices 125A-N and the content administrator device 145 can be communication devices through which an end user can submit requests to receive content. The requests can be requests to a search engine and the requests can include search queries. In some implementations, the requests can include a request to access a web page. In some implementations, the content administrator device 145 can include computing devices configured to communicate via the network 105 to retrieve and display interaction statistics data with information resources and content elements of the information resources from the data processing system 110, content provider devices 115A-N, content publisher devices 120A-N.

The content provider devices 115A-N, the content publisher devices 120A-N, the client devices 125A-N, and the content administrator device 145 can include a processor and a memory or a processing circuit as discussed above and as discussed in more detail in connection with FIG. 5. The memory stores machine instructions that, when executed by processor, cause processor to perform one or more of the operations described herein. The processor may include a microprocessor, application-specific in (integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM)), flash memory, optical media, or any other suitable memory from which the processor can read instructions. The instructions may include code from any suitable computer-programming language.

The content provider devices 115A-N, the content publisher devices 120, the client devices 125A-N, and the content administrator device 145 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider devices 115A-N, the content publisher devices 120A-N, the client devices 125A-N, and the content administrator device 145 (e.g., a built-in display, microphone, etc.) or external to the housing of content provider devices 115A-N, the content publisher devices 120A-N and the client devices 125A-N (e.g., a monitor connected to the client device 125A-N, a speaker connected to the client device 125A-N, etc.), according to various implementations. For example, the content provider devices 115A-N, the content publisher devices 120A-N, the client devices 125A-N, and the content administrator device 145 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider devices 115A-N. In some implementations, the advertiser can communicate with the data processing system 110 via a user interface displayed on the user interface devices of the content provider devices 115A-N.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content delivery module 130, at least one interaction recorder module 132, at least one script provider module 136, and at least one interaction statistics module 134. The conversion tracker module 130 can include at least one processing unit, server, virtual server, circuit, engine, agent, appliance, or other logic device such as programmable logic arrays configured to communicate with the database 138 and with other computing devices (e.g., the content provider computing device 115, the content publisher devices 120A-N, the client device 125, or the content administrator device 145) via the network 105. The data processing system 110 can also include one or more content repositories or databases 138. The databases 138 can be local to the data processing system 110. In some implementations, the databases 138 can be remote to the data processing system 110 but can communicate with the data processing system 110 via the network 105.

The content delivery module 130, the interaction recorder module 132, the script provider module 130, and the interaction statistics module 134 can include or execute at least one computer program or at least one script. The content delivery module 130, the interaction recorder module 132, the script provider module 136, and the interaction statistics module 134 can be separate components, a single component, or part of the data processing system 110. The content delivery module 130, the interaction recorder module 132, the script provider module 136, and the interaction statistics module 134 can include combinations of software and hardware, such as one or more processors configured to execute one or more scripts.

The data processing system 110 can also include one or more content repositories or databases 138. The databases 138 can be local to the data processing system 110. In some implementations, the databases 138 can be remote to the data processing system 110 but can communicate with the data processing system 110 via the network 105. The databases 138 can include information resource, content elements, and interaction statistics visualization script, among others, to serve to any of the content provider devices 115A-N, content publisher devices 120A-N, client devices 125A-N, or the content administrator device 145. In some implementations, the databases 138 can include the interaction log 140. The interaction log 140 can include an information resource identifier and a content element identifier. The information resource identifier can include, for example, a resource address (e.g., Uniform Resource Locator (URL)), an alphanumerical identifier, or an array index. The content element identifier can include, for example, a resource address (e.g., URL), an alphanumerical identifier, or an array index. The interaction log 140 can include a log listing each interaction with the content elements of the information resource. Each entry of the interaction log 140, for example, can include an interaction type and a timestamp arranged by content element identifier and information resource identifier. In some implementations, the interaction log 140 may be maintained by the interaction recorder module 132 or the interaction statistics module 134. In some implementations, information resources and content elements of the information resources can include those illustratively depicted in FIGS. 2B and 3A-3F. Additional details of the contents of the database 138 will be provided below.

The content delivery module 130 can receive a request for content from one of the client devices 125A-N. The request for content can include a request for an information resource or a request for content element for the information resource. The information resource may be, for example, a webpage. The content element may be, for example, a document object model (DOM) object of the webpage, such as a textbox, inline frame, video, image, and body text, among others. The request for content can include an identifier for the information resource or the content element. For example, the request for content can include Uniform Resource Locator (URL) referring to a specific resource such as a webpage (e.g., "https://www.example.com/homepage.html"). The host name of the URL for the information resource may differ from the host name of the URL for the content element. For example, the URL for the information resource can be "https://www.example_10.com/index.html" but the URL for the content element can be "https://www.example_23.com/content_obj_271828.html."

The content delivery module 130 can transmit the information resource or the content element of the information resource to the client device 125A-N. The content delivery module 130 can identify the address or identifier for the information resource and the content element included in the request for content. The content delivery module 130 can retrieve, select, or otherwise access the information resource or the content element identified by the address or identifier. Upon retrieving the information resource or the content element identifier in the request from the client device 125A-N content delivery module 130 can transmit the information resource or the content element identified by the address or identifier to the client device 125A-N.

In some implementations, the content delivery module 130 can receive the content element from an ad auction system that can select the content element for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad.

The interaction recorder module 132 can accumulate interactions by the client devices 125A-N on the information resource or the content elements of the information resource. In some implementations, the interaction recorder module 132 can receive a ping or interaction indicator indicating interaction on the information resource or the content element of the information resource. The information resource or the content element transmitted to the client device 125A-N can include a pingback script. Once loaded onto the client device 125A-N, the pingback script can transmit a ping or an interaction identifier indicating interaction by the client device 125A-N on the respective content element. The ping or the interaction indicator can include an information resource identifier, a content element identifier, an interaction type, a client device identifier, timestamp, and other metadata. The content element identifier can correspond to the content element upon which the client device 125A-N detected an event on. The interaction type can identify which event was detected by the client device 125A-N from an input-output device such as a mouse, keyboard, and touchscreen among others. The detected event may include, for example, click, touch, hover over, hover out, key press, mouse wheel, and scrolling, among others. The client device can correspond a unique alphanumerical identifier or a device address (e.g., IP or MAC address) corresponding to the client device 125A-N. The timestamp can include the time at which the event was detected by the client device 125A-N. Examples of metadata included in the ping or the interaction indicator may include a location identifier, device type identifier, application identifier, and account identifier, among others.

Upon receiving the ping or interaction indicator, the interaction recorder module 132 can save, update, or otherwise write onto the interaction log 140 of the database 138. In some implementations, the interaction recorder module 132 can create or generate an entry including the information resource identifier, the content element identifier, the interaction type, the client device identifier, and the timestamp from the ping or the interaction indicator. In some implementations, the interaction recorder module 132 can process the fields of the ping or the interaction indicator prior to recording the fields onto the interaction log 140 of the database 138. In some implementations, the interaction recorder module 132 can generate an entry using a subset of the fields in the ping or the interaction indicator. For example, the interaction recorder module 132 can record the information resource identifier, the content element identifier, and timestamp, while not saving the client device identifier and the interaction type. In some implementations, the interaction recorder module 132 can identify a range of times corresponding to the time stamp and then record the corresponding range of time for the entry in the interaction log 140.

In some implementations, the interaction recorder module 132 can maintain the interaction log 140 by one or more client device segments. In some implementations, the interaction recorder module 132 can save, update or otherwise write the ping or the indication indicator onto the interaction log 140 of the database 138 arranged by the one or more client device segments. The one or more client device segments may be based on the location, identifier, device type identifier, and the account identifier, or any other client device attribute, included in the metadata of the ping or the interaction indicator. In some implementations, the interaction recorder module 132 can save, update, or otherwise write the ping or the indicator into separate data structures in the interaction log 140 of the database 138. For example, if the interaction recorder module 132 receives one ping with the device type identifier "mobile phone" and another ping with the device type identifier "laptop," the interaction recorder module 132 can append one entry for the ping with the device type identifier "mobile phone" onto a data structure for mobile phones on the interaction log 140 and append another entry for the ping with the device type identifier "laptop" onto a separate, corresponding data structure for laptops on the interaction log 140 of the database 138.

The interaction statistics module 134 can calculate one or more interaction statistics for each of the content elements of the information resource based on the entries in the interaction log 140 of the database 138. The one or more interaction statistics can include a number of interactions with one content element prior to or subsequent to other content elements of the information resource. In some implementations, the one or more interaction statistics may be measured as percentages of client devices 125A-N that interact with one content element prior to or subsequent to other content elements of the information resource. For example, for content element "A," 66% of the client devices may subsequently interact with content element "B," while the remaining 34% of the client devices may subsequently interact with content element "C." In some implementations, the one or more interaction statistics may be measured normalized over all the client devices 125A-N that interact the information resource. In some implementations, the interaction recorder module 132 can maintain the interaction log 140 including an interaction dataset. The interaction dataset can include fields of the interaction log 140 of the database 138, such as number of interactions by the one or more client devices 125A-N, the time duration of the interactions on each content element on information resources by the one or more client devices 125A-N, or the client device attribute for each client device 125A-N. In some implementations, the interaction dataset may be a data structure (e.g., array, list, linked list, heap, table, tree, matrix, etc.) arranged by a client device identifier or account identifier corresponding to each of the one or more client devices 125A-N.

In some implementation, the interaction statistics module 134 can identify sequence of interactions by the one or more client devices 125A-N among the content elements of the information resource based on the content element identifier and the timestamp of the interaction log 140. For example, the interaction statistics module 134 can access the entries of the interaction log 140 and identify which content elements are recorded prior to or subsequent to interactions with other content elements. The one or more interaction statistics can include time duration of interaction for each content element of the information resource. In some implementations, the interaction statistics module 134 can measure, determine, calculate, or otherwise identify time difference between each interaction among the content elements of the information resource. For example, the interaction statistics module 134 can access the entries of the interaction log 140, identify timestamp of temporally prior or subsequent interaction, and subtract the two time stamps to identify the time durations. In some implementations, the interaction statistics module 134 can calculate the one or more metrics over a specified time period. For example, the interaction statistics module 134 can identify the sequence of interactions by the one or more client devices 125A-N among the content elements and the time durations of the interactions within the specified time period. In some implementations, the interaction statistics module 134 can store save, or otherwise write onto the database 138 to record the one or more calculated interaction statistics.

In some implementations, the interaction statistics module 134 can receive a request for interaction statistics from any of the content provider devices 115A-N, the content publisher devices 120A-N, the client devices 125A-N, and the content administrator device 145. In some implementations, the interaction statistics module 134 can calculate the one or more interaction statistics, responsive to receiving the request for interaction statistics. The request for interaction statistics can include an information resource identifier or content element identifier. In some implementations, the request for interaction statistics can further include a specified time period. In some implementations, the request for interaction statistics can include a client device segment identifier. The client device segment identifier can correspond to a subset of the one or more client devices 125A-N. The client device segment identifier may be, for example, any alphanumeric identifier used to uniquely identify a subset of the client devices 125A-N. In some implementations, the interaction statistics module 134 can retrieve or access the database 138 for the one or more calculated interaction statistics. In some implementations, the one or more calculated interaction statistics retrieved may be over the specified time period. In some implementations, the interaction statistics module 134 can calculate the one or more interaction statistics for the content elements of the information resource identified in the request for interaction statistics. In some implementations, the interaction statistics module 134 can calculate the one or more interaction statistics for the one or more content elements identified in the request for interaction statistics. For example, the request for the interaction statistics may identify a subset of the content elements of the information resource. In some implementations, the interaction statistics module 134 can retrieve or access the one or more interaction statistics for the subset of client devices identifier in the client device segment identifier.

The interaction statistics module 134 can maintain a timer to determine whether time elapsed since receiving the request for interaction statistics is greater than or equal to a predefined time threshold. The timer can include an application, service, server, daemon, routine, or other executable logic for maintaining time. In some implementations, the interaction statistics module 134 can determine whether the time elapsed since transmitting the one or more interaction statistics is greater than or equal to the predefined time threshold. The interaction statistics module 134 can transmit the one or more interaction statistics to the content provider devices 115A-N, the content publisher devices 120A-N, the client devices 125A-N, and the content administrator device 145 associated with the request for interaction statistics, responsive to determining that the time elapsed is greater than or equal to the predefined time threshold. In some implementations, the interaction statistics module 134 can determine whether the time elapsed since transmitting the one or more interaction statistics is greater than or equal to the predefined time threshold.

The interaction statistics module 134 can maintain a comparator to determine whether the one or more interaction statistics have changed by at least a predefined statistic threshold. The comparator can include an application, service, server, daemon, routine, or other executable logic for comparing the one or more interaction statistics. In some implementations, the interaction statistics module 134 can determine whether the one or more interaction statistics have changed by at least a predefined statistic threshold, responsive to determining that the time elapsed since the request for interaction statistics or since transmitting the one or more interaction statistics is less than the predefined time threshold. In some implementations, the interaction statistics module 134 can retrieve the entries of the interaction log 140 of the database 138 for the information resource or the content element identified in the request for interaction statistics. In some implementations, the interaction statistics module 134 can determine whether the one or more interaction statistics have changed by at least a predefined statistic threshold per client device segment.

In some implementations, the interaction statistics module 134 can compare a length of the currently retrieved entries to a length of the previously retrieved entries of the interaction log 140 of the database 138. If the length of the currently retrieved entries is greater than the length of the previously retrieved entries by at least a predefined threshold length, the interaction statistics module 134 can recalculate the one or more interaction statistics based on the currently retrieved entries. In some implementations, the interaction statistics module 134 can transmit the recalculated one or more interaction statistics to the content provider devices 115A-N, the content publisher devices 120A-N, the client devices 125A-N, and the content administrator device 145 associated with the request for interaction statistics. For example, the number of entries in the interaction log 140 for a specific inline frame on the information resource may be 12,503 when the original request for the interaction statistics was received but may then be 15,012 at some time later, and the predefined statistic threshold length may be 2,500. In this example, the interaction statistics module 134 can calculate the difference in the lengths of the entries in the interaction log 140 for the inline frame and determine that the difference is greater than the predefined statistic threshold length. Continuing the example, the interaction statistics module 134 can then recalculate the interaction statistics for the inline frame and transmit the recalculated interaction statistics to the computing device that made the original request for interaction statistics. In some implementations, the interaction statistics module 134 can compare the length of the currently retrieved entries to the length of the previously retrieved entries per client device segment.

In some implementations, the interaction statistics module 134 can calculate the one or more interaction statistics from the currently retrieved entries of the interaction log 140. In some implementations, the interaction statistics module 134 can compare the one or mote interaction statistics calculated from the currently retrieved entries of the interaction log 140 to the one or more interaction statistics calculated from the previously retrieved entries of the interaction log 140 by at least a predefined statistic threshold. In some implementations, the predefined statistic threshold may differ from interaction type. For example, the predefined statistic threshold may be 0.01 for click rates but 0.2 for hover over rates. In some implementations, if any of the one or more interaction statistics calculated from the currently retrieved entries of the interaction log 140 is different from the corresponding one or more interaction statistics calculated from the previously retrieved entries of the interaction log 140 by the predefined statistic threshold, the interaction statistics module 134 can transmit the one or more interaction statistics calculated from the currently retrieved entries to the content provider devices 115A-N, the content publisher devices 120A-N, the client devices 125A-N, and the content administrator device 145 associated with the request for interaction statistics. For example, if the key press rate for a specified text box on an information resource has changed by 0.34 and the predefined statistic thresholds for key press rates for text boxes is 0.2, the interaction statistics module 134 can transmit the key press rate to the original computing device that sent the request for interaction statistics for the text box. In some implementations, the interaction statistics module 134 can calculate the one or more interaction statistics from the currently retrieved entries of the interaction log 140 per client device segment.

In some implementations, the interaction statistics module 134 can determine the number of the one or more interaction statistics calculated from the currently retrieved entries different from the one or more interaction statistics calculated from the previously retrieved entries by the predefined statistic threshold. If the number of the one or more interaction statistics calculated from the currently retrieved entries different from the one or more interaction statistics calculated from the previously retrieved entries by the predefined statistic threshold, the interaction statistics module 134 can transmit the one or more interaction statistics calculated from the currently retrieved entries to the content provider devices 115A-N, the content publisher devices 120A-N, the client devices 125A-N, and the content administrator device 145 associated with the request for interaction statistics. In some implementations, the interaction statistics module 134 can determine the number of the one or more interaction statistics calculated from the currently retrieved entries different from the one or more interaction statistics calculated from the previously retrieved entries from the interaction log 140 by the predefined statistic threshold per client device segment.

The script provider module 136 can receive the request for interaction statistics from any of the content provider devices 115A-N, the content publisher devices 120A-N, the client devices 125A-N, and the content administrator device 145. The request for interaction statistics can include an information resource identifier or content element identifier. The script provider module 136 can retrieve the information resource and the content element identified in the request from any of the content provider devices 115A-N and the content publisher devices 120A-N, responsive to receiving the request. For example, if the request included the URL "www.example_431.com/index.html" corresponding to an inline frame content element on an information resource, the script provider module 136 can retrieve the content element from the any of the content provider devices 115A-N or the content publisher devices 120A-N corresponding to the URL.

The script provider module 136 can retrieve access, or receive the one or more interaction statistics maintained and calculated by the interaction statistics module 134 corresponding to the information resource identifier or the content element identifier. In some implementations, the script provider module 136 can transmit a request to the interaction statistics module 134 or the database 138 for the one or more interaction statistics corresponding to the information resource identifier or the content element identifier. In some implementations, the script provider module 136 can subsequently receive the one or more interaction statistics from the interaction statistics module 134 or the database 138. The script provider module 136 can insert, embed, append, or otherwise add an interaction statistics visualization script into the information resource or the content element.

The interaction statistics visualization script can include one or more modules and the one or more interaction statistics calculated by the interaction statistics module 134. The interaction statistics visualization script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript™, among others. The computer-executable instructions can be executed by an application of any of the content provider devices 115A-N, the content publisher devices 120A-N, the client devices 125A-N, and the content administrator device 145. The application may have caused the content administrator device 145 to transmit the request for interaction statistics received by the script provider module 136. The application can include, for example, an Internet browser, mobile application, or any other computer program capable of reading and executing the computer-executable instructions. In brief overview, the computer-executable instructions of the interaction statistics visualization script, when executed by one or more processors of any of the content provider devices 115A-N, the content publisher devices 120A-N, the client devices 125A-N, can cause an application running on one of more processors to include a graph element in a graphical user interface based on the calculated one or more interaction statistics for the corresponding information resource or the content element. Additional details relating to the functions of the interaction statistics visualization script are provided herein with respect to FIGS. 2A, 2B, and 3A-3F.

The script provider module 136 can transmit the information resource or the content element including the interaction statistics visualization script to the content provider devices 115A-N, the content publisher devices 120A-N, the client devices 125A-N, or the content administrator device 145 associated with the request for interaction statistics. In some implementations, the script provider module 136 can transmit the interaction statistics visualization script without the information resource or the content element to the content provider devices 115A-N, the content publisher devices 120A-N, the client devices 125A-N, or the content administrator device 145. For example, the content administrator device 145 that transmitted the request for interaction statistics may already have the information resource and transmitted the interaction statistics visualization script. In some implementations, the script provider module 136 can transmit the interaction dataset that includes the interaction statistics from the interaction statistics module 134 or the database 138. In some implementations, the script provider module 136 can transmit the interaction statistics visualization script to one of the content provider devices 115A-N or the content publisher devices 120A-N associated with the request for interaction statistics. Receipt of the interaction statistics visualization script can cause the respective content provider device 115A-N or the content publisher device 120A-N to insert the interaction statistics visualization script into the information resource or the content element and transmit the information resource or the content element with the interaction statistics visualization script to any one of the client devices 125A-N or the content administrator device 145. In some implementations, the script provider module 136 can transmit the interaction statistics visualization script or the one or more interaction statistics, responsive to the interaction statistics module 134 determining that the time elapsed since receiving the request for interaction statistics is greater than or equal to the predefined time threshold or determining that the one or more interaction statistics has changed by the predefined statistic threshold.

Figure 2A:
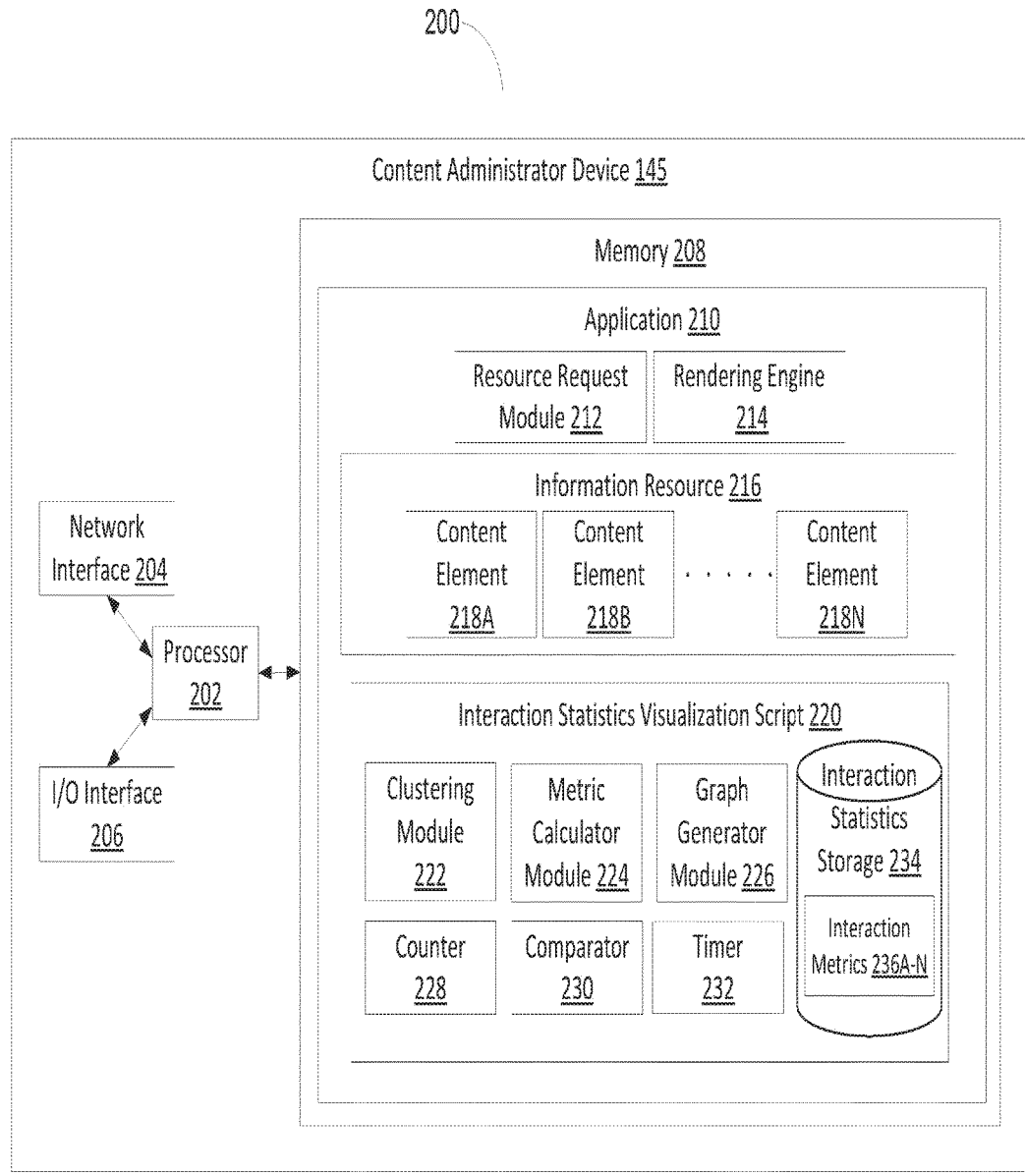
FIG. 2A is a block diagram depicting a system for rendering webpage interaction statistics data over graphical user interfaces in a computer network environment, according to an illustrative implementation.

Referring to FIG. 2A, FIG. 2A is a block diagram depicting one implementation of a system 200 for rendering webpage interaction statistics data over graphical user interfaces in a computer network environment. The interaction statistics visualization system 200 can include a computing device (e.g., the client device 125A-N or the content administrator device 145 as depicted in FIG. 1) with one or more processors 202, a network interface 204, input-output interface 206, and memory 208 for running an application 210. The one or more processors 202, the network interface 204, the input-output interface 206, and the memory 208 may be hardware components in the computing device those detailed below in conjunction with FIG. 5. The network interface 204 may be configured to interface with the network 105 described in FIG. 1. The input-output interface 206 may include a mouse, a keyboard, a touchscreen, and or microphone among others. The application 210 can include, for example, an Internet browser, mobile application, or any other computer program capable of executing or otherwise invoking computer-executable instructions processed by the client device 125A-N or the content administrator device 145, such as the information resource 216, one or more content elements, a resource request module 212, a rendering engine 214, and the interaction statistics visualization script 220. The interaction statistics visualization script 220 can be received from the data processing system 110 or any interaction log system, and can include a clustering module 222, a metric calculator module 224, a graph generator module 226, a counter 228, a comparator 230, and a timer 232 and an interaction statistics storage 234 with one or more interaction statistics 236A-N. The counter 228, comparator 230, and timer 232 each can include an application, service, server, daemon, routine, or other executable logic for counting any set of values, comparing any set of values including interaction sequence metrics, and maintaining any time value respectively. The application 210 and the components, scripts, and modules therein may include any form of executable logic or instructions on memory or in a non-transitory computer-readable medium executed, run, or otherwise processed by the processor 202. The processor 202 in turn may interface with the network interface 202 and the input-output interface 206 in accordance with the executable logic or instructions of the application 210 and the components, scripts, and modules therein.

The resource request module 212 can transmit, via the network interface 204 of the content administrator device 145, a request for interaction metrics to the data processing system 110. The request for interaction statistics can identify an information resource 216 or a content element 218A-N on the information resource 216. In some implementations, the request for interaction statistics can include an information resource identifier or content element identifier. The information resource identifier can correspond to rite information resource 216. The information resource identifier can include, for example, a resource address (e.g., Uniform Resource Locator (URL)) or any alphanumerical identifier. The content element identifier can correspond to any of the one or more content elements 218A-N. The content element identifier can include, for example, a resource address (e.g., URL) or any alphanumerical identifier. In some implementations, the request for interaction statistics can further include a specified time threshold for the interaction statistics. The specified time threshold may indicate a range of times for interaction statistics 236A-N. In some implementations, the resource request module 212 can transmit multiple requests for interaction statistics to the data processing system 110 at periodic time intervals.

The resource request module 212 can subsequently receive via the network interface 204, from the data processing system 110, the interaction statistics visualization script 222 without the information resource 216. In some implementations, the clustering module 222, the metric calculator module 224, the graph generator module 222, the counter 228, the comparator 230, and the time 232 of the interaction statistics visualization script 222 may have been pre-installed on the computing device. In some implementations, the resource request module 212 can subsequently receive, via the network interface 204, the interaction metrics 236A-N to be stored at the interaction statistics storage 234. In some implementations, the resource request module 212 can subsequently receive, via the network interface 204, from the data processing system 110, the information resource 216 or the content element 218A-N. The information resource 216 can include one or more content elements 218A-N and the interaction statistics visualization script 220, including the one or more interaction statistics 236A-N.

Each of the one or more content elements 218A-N can correspond to a node of a document object model (DOM) tree and a cascading style sheets (CSS) style generated by the application 210 (e.g., a resource parser module). In some implementations, the content element 218A-N can include the interaction statistics visualization script 220. Each of the one or more content elements 218A-N can correspond to a content element identifier. In some implementations, a subset of the one or more content elements 218A-N can be actionable, while another subset of the one or more content elements 218A-N may be non-actionable. For example, a body text content element on the information resource 216 may not have any instructions executed responsive to an event (e.g., click, key press, etc.) and may thus be considered non-actionable, each of the one or more content elements 218A-N may be a different type of content element. For example, one content element 218A-N may be an inline name element, while another content element 218A-N may be an image element.

Each of the one or more interaction statistics 236A-N can correspond to a respective content element of the one or more content elements 218A-N. In some implementations, the one or more interaction statistics 236A-N may be for a plurality of information resources. The one or more interaction statistics 236A-N can include a number of interactions by the client devices 125A-N with the respective content element 218A-N prior or subsequent to interacting with other content elements 218A-N of the information resource 216. In some implementations, the one or more interaction statistics 236A-N can include time duration for interacting with the respective content element 218A-N by the client devices 125A-N. In some implementations, the one or more interaction statistics 236A-N can correspond to at least one client device segment or client device attribute corresponding to a subset of the one or more client devices 125A-N. In some implementations, the one or more interaction statistics can include a number of interactions by a subset of client devices with one content element 218A-N prior or subsequent to interacting with other content elements 218A-N and time duration interacting with content element 218A-N by the subset of client devices 218A-N. In some implementations, the number of interactions and the time durations may be stored as a data structure (e.g., array, list, linked list, heap, table, tree, matrix, etc.) arranged or otherwise indexed by content element identifier or client device segment identifier.

Figure 2B:
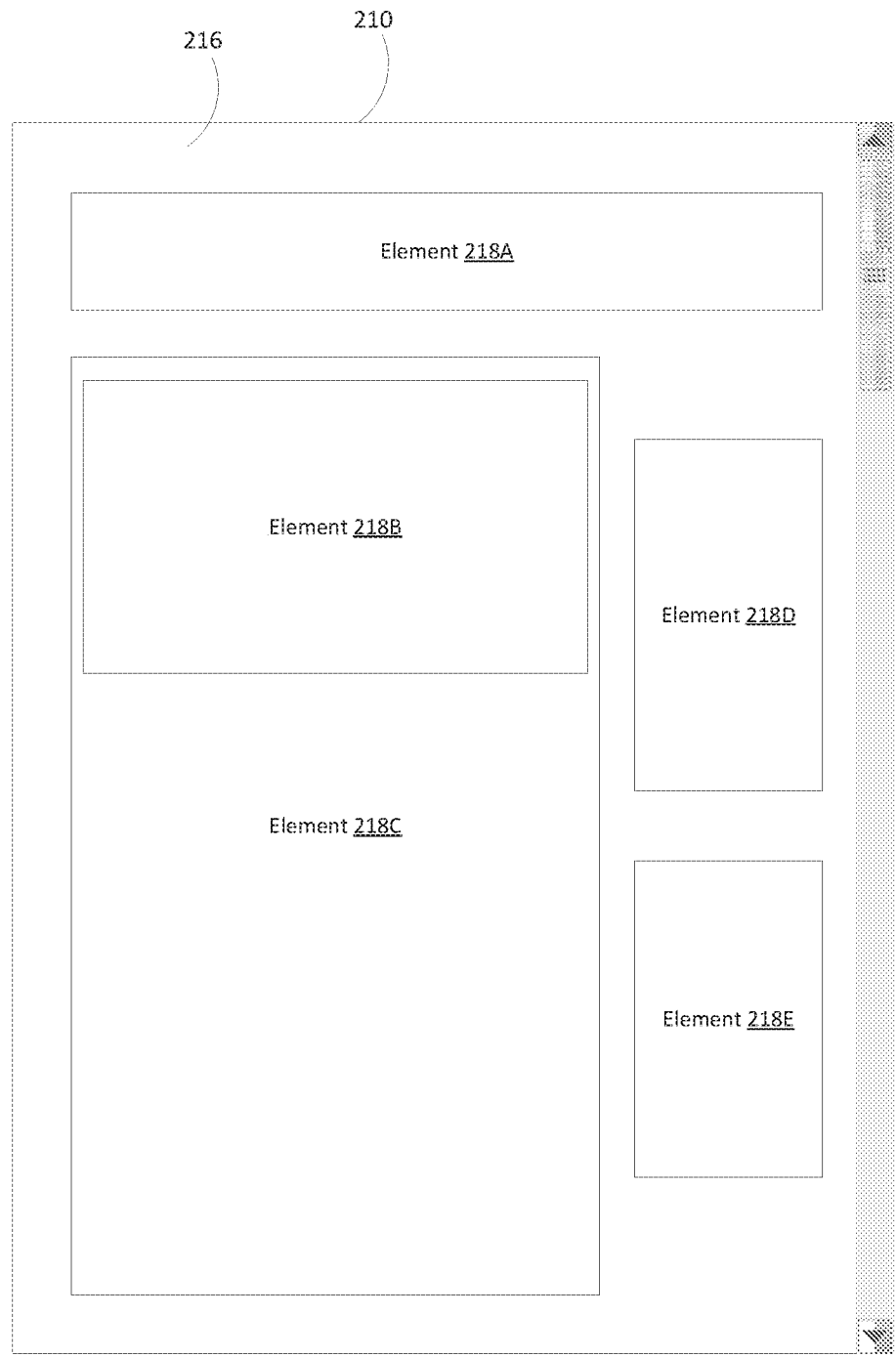
FIG. 2B is a block diagram depicting an information resource with content elements, according to an illustrative implementation.

Referring to FIG. 2B, a block diagram depicting one implementation of the information resource 216 with content elements 218A-E via the viewport of the application 210 is shown. As in the example illustrated in FIG. 2B, the information resource 216 may include five content elements 218A-E. The first content element 218A may be an image element positioned generally along the lop of the information resource 216 in the viewport of the application 210. The second content element 218B may be a video element, positioned generally above the middle and aligned to the left on the information resource 216. The third content element 218C may be a body text element positioned generally in the middle and aligned and along the left of the information resource 216. The fourth content element 218D may be an inline frame element located generally above the middle and aligned to the right on the information resource 216. The filth content element 218E may be located generally below the middle and aligned to the right on the information resource 216. Each of the five content elements 218A-E may have different, corresponding interaction statistics 236A-N. The first, second, fourth, and fifth content elements 218A, 218B, 218D, and 218E may be actionable, while the third content element 218C may be non-actionable. Referring again to FIG. 2A, the resource request module 212 can receive the information resource 216, the one or more content elements 218A-N, the interaction statistics visualization script 220, the one or more interaction statistics 236A-N repeatedly. For example, the application 210 may have loaded and may still display the information resource 216 on the display of the content administrator device 145. Subsequently, the resource request module 212 can receive, from the data processing system 110, a second or updated version of the interaction statistics visualization script 220 and the one or more interaction statistics 236A-N. In some implementations, the resource request module 212 can, at a first time, receive the information resource 216 or the content element 218A-N. In some implementations, the resource request module 212 can, at a second time subsequent to the first time, receive the second version or updated version of the information resource 216, the content elements 218A-N, the interaction statistics visualization script 220, or the interaction statistics 236A-N. In some implementations, the resource request module 212 can access the timer 230 to retrieve time. In some implementations, using the timer 230, the resource request module 212 can transmit a request for interaction statistics, responsive to determining that the time elapsed since the time of receiving the last interaction statistics 236A-N has elapsed by at least a predefined time threshold. In some implementations, the resource request module 212 can receive the updated interaction statistics 236A-N. In some implementations, the resource request module 212 can receive the one or more interaction statistics 236A-N, responsive to the data processing system 110 determining that the interaction data has changed by at least a predefined statistic threshold between the second time and the first time. In some implementations, the resource request module 212 can receive the one or more interaction statistics 236A-N, responsive to the data processing system 110 determining that a predefined time threshold has lapsed between the first time and the second time.

The clustering module 222 can calculate or determine, using a clustering algorithm, one or more similarity measures among one or more subsets of client devices from the one or more client devices 125A-N based on the interaction dataset. Examples of the clustering algorithm can include k-means clustering, density-based spatial clustering, expectation-maximization (EM) clustering, principal component analysis (PCA), and linear discriminant analysis (LDA), among others. The one or more similarity measures can be, for example, an expected value, a variance, or a distance measure (e.g., Euclidean, Mahalanobis, Manhattan, Chebyshev, Hamming, etc.), or another measure among the interaction dataset for each client device 125A-N within the subset of client devices. While applying the clustering algorithm, the data points from the interaction dataset may be stored or maintained in a data structure (e.g., array, list, linked list, heap, table, tree, matrix, etc.) arranged or indexed by a client device identifier corresponding to each of the client devices 125A-N. In some implementations, the clustering module 222 can calculate the one or more similarity measures among the one or more subsets of client devices based on the number of interactions with one content element 218A-N prior or subsequent to interacting with another content element 218A-N, the time durations of the interactions for each content element 218A-N, and the client device attribute for each client device 125A-N. In some implementations, the clustering module 222 can calculate any number of similarity measures for any number of subsets of client devices from the plurality of client devices 125A-N based on the interaction dataset. In some implementations, the clustering module 222 can calculate the one or more similarity measures among the one or more subsets of client devices further based on the client device attributes for each client device 125A-N. In some implementations, the clustering module 222 can, using the clustering algorithm, identify one or more sub-subsets of client devices from at least one subset of client devices from the one or more client devices 125A-N based on the corresponding interaction dataset.

In some implementations, using the counter 228, the clustering module 222 can iteratively calculate the one or more similarity measures based on the interaction dataset. In some implementations, using the comparator 230, the clustering module 222 can compare a difference of the respective similarity measures between each iteration to a threshold measure or a convergence threshold. For example, the clustering module 222 can apply a K-nearest neighbors (k-NN) algorithm using the number of interactions and time duration of interactions per content element 218A-N for each of the client devices 125A-N. The clustering module 222 can initially set each client device 125A-N to a data point in an n-dimensional space using the number of interactions among the content elements 218A-N, time duration of interactions per content element 218A-N, client device attributes, and content element 218A-N, or any combination thereof, as axes. The clustering module 222 can then set the data points for each client device 125A-N among k segments. After segmenting the data points, the clustering module 222 can identify the centroid for each segment and calculate the distance between the centroid and the data points assigned to the segment. For each segment, the clustering module 222 can also calculate the average point among the data point assigned to the segment and compare the average point to the centroid. If the distance between the average point and the centroid is above a convergence threshold, the clustering module 222 can set the average point as the centroid and reassign data points corresponding to a client device 125A-N to a new segment. In this example, this process may be repeated until the distance between the average point and the centroid or the difference between the previously calculated centroid and the currently calculated centroid is below a convergence threshold.

In some implementations, using the counter 228, the clustering module 222 can determine whether the calculation of the one or more similarity measures is the first time or iteration. In some implementations, the clustering module 222 can, using the clustering algorithm, recalculate the one or more similarity measures, responsive to determining that the calculation of the one or more similarity measures is the first time or iteration. In some implementations, the clustering module 222 can compare a number of times of the calculation of the one or more similarity measures to a threshold number of iterations. The threshold number of iterations may be predefined or pre-set based on the number of subsets of client devices. For example, the threshold number of iterations may be 1,500 if there are to be 50 subsets of client devices but 15,000 if there are lobe 2,000 subsets of client devices segmented in the clustering algorithm. In some implementations, the clustering module 222 can, using the clustering algorithm, recalculate the one or more similarity measures, responsive to determining that the number of times of the calculation of the one or more similarity measures is less than the threshold number of iterations. In some implementations, the clustering module 222 can terminate the clustering algorithm or end further calculations of the one or more similarity measures, responsive to determining that the number of times of the calculations is greater than or equal to the threshold number of iterations.

The clustering module 222 can identify or select, using the clustering algorithm, at least one subset of client devices from the plurality of client devices 125A-N based on the respective similarity measure among the subset of client devices. In some implementations, the clustering module 222 can identify a number of client devices assigned to the one or more subsets of client devices. In some implementations, using the comparator 228, the clustering module 222 can compare the number of client devices in each subset of client devices to a threshold number. In some implementations, the clustering module 222 can select the at least one subset of client devices, responsive to determining that the number of client devices for the respective subset of client devices is greater than or equal to the threshold number. In some implementations, the clustering module 222 can, using the clustering algorithm, recalculate the one or more similarity measures for another subset of client devices from the plurality of client devices 125A-N, responsive to determining that the number of client devices for the respective subset of client devices is less than the threshold number. For example, if none of the subsets of client devices is greater than the threshold, the clustering module 222 can re-run the clustering algorithm to identify subsets of client devices based on similarity measures among the plurality of client devices 125A-N.

In some implementations, the clustering module 222 can identify or determine an associated number of content elements corresponding to the at least one subset of client devices from the plurality of client devices 125A-N based on the similarity measure among the subset of client devices. For example, one subset of client devices may be associated with three content elements 218A-C of the information resource 216, while another subset of client devices may be associated with four content elements 218B-E of the information resource 216. The associated number of content elements may range from one to a total number of content elements 218A-N on the information resource. In some implementations, the clustering module 222 can compare the associated number of content elements to a predefined threshold number. In some implementations, the clustering module 222 can select the at least one subset of client devices, responsive to determining that the number of content elements is greater than or equal to the predefined threshold number. In some implementations, the clustering module 222 can select another subset of client devices, responsive to determining that the associated number of content elements is less than the predefined threshold number. In some implementations, the clustering module 222, using the clustering algorithm, can recalculate the one or more similarity measures for another subset of client devices from the plurality of client devices 125A-N, responsive to determining that the associated number of content elements is less than the predefined threshold number. For example, the clustering module 222 can re-run the clustering algorithm to find new subsets of client devices based on similarity measures among the plurality of client devices 125A-N.

The metric calculator module 224 can determine or identify the one or more content elements 218A-N for the corresponding one or more interaction statistics 236A-N based on the corresponding content element identifier. In some implementations, the metric calculator module 224 can search for the one or more content elements 218A-N for the corresponding one or more interaction statistics 236A-N based on the corresponding content element identifier. For example, the metric calculator module 224 can access a data structure storing the interaction statistics 236A-N and the content element identifiers. In this example, using the content element identifier from the data structure, the metric calculator module 224 can search to find the corresponding content element 218A-N by iterating through the one or more content elements 218A-N using the counter 228. In some implementations, the metric calculator module 224 can identify the one or more interaction statistics 236A-N for each of the one or more content elements 218A-N based on the corresponding content element identifier. In some implementations, the metric calculator module 224 can identify the one or more content elements 218A-N corresponding to the selected subset of client devices. For example, the subset of client devices identified and selected from the clustering algorithm may be associated with three 218B-D of the six content elements 218A-F on the information resource 216.

The metric calculator module 224 can determine or identify which of the one or more content elements 218A-N are actionable. In some implementations, the metric calculator module 224 can determine or identify which of the one or more content elements 218A-N are actionable among the one or more content elements 218A-N associated with the subset of client devices. Actionable content elements 218A-N can include those content elements 218A-N, event listeners of which are enabled. The metric calculator module 224 can determine or identify which of the one or more content elements 218A-N are non-actionable. In some implementations, the metric calculator module 224 can determine or identify which of the one or more content elements 218A-N are non-actionable among the one or more content elements 218A-N associated with the subset of client devices. Non-actionable content elements 218A-N can include those content elements 218A-N, the event listeners of which are disabled. In some implementations, non-actionable content elements 218A-N can also include those content elements 218A-N that do not specify any further instructions or executable logic upon triggering of event listeners for the respective content element 218A-N. For example, a body text content element 218A on the information resource 216 may include code specifying no further actions are to be taken upon the triggering of an "onClick" event listener. In some implementations, the metric calculator module 224 can determine which of the one or more content elements 218A-N are non-actionable based on a corresponding element type of the content element 218A-N.

The metric calculator module 224 can calculate one or more interaction sequence metrics for interactions by the at least one selected subset of client devices with each content element 218A-N prior or subsequent to interacting with other content elements 218A-N based on the interaction statistics 236A-N. The one or more interaction sequence metrics may indicate a likelihood or frequency of the client devices 125A-N of the at least one selected subset of client devices with one content element 218A-N prior or subsequent to interacting with another content element 218A-N. In some implementations, the metric calculator module 224 can calculate the one or more interaction sequence metrics for the interactions by the at least one selected subset of client devices with one of the identified content elements 218A-N prior or subsequent to interacting with another content element of the identified content elements 218A-N. In some implementations, the metric calculator module 224 can calculate the one or more interaction sequence metrics, responsive to determining that the number of client devices for the respective subset of client devices is greater than or equal to the threshold number. The interaction statistics metric may be stored or maintained in a data structure (e.g., array, list, linked list, heap, table, tree, matrix, etc.) arranged, indexed, or otherwise identified by the content element identifier In some implementations, the metric calculator module 224 can calculate the one or more interaction sequence metrics based on the number of interactions and the time durations for the respective content element 218A-N. In some implementations, the metric calculator module 224 can calculate the interaction sequence metric at the predefined time interval. In some implementations, the metric calculator module 224 can calculate the interaction sequence metric, responsive to receiving the updated one or more interaction statistics 236A-N. In some implementations, the metric calculator module 224 can calculate the one or more interaction sequence metrics based on the interaction statistics 236A-N for each client device segment.

In some implementations, the metric calculator module 224 can identify the one more interaction statistics 236A-N corresponding to the at least one selected subset of client devices. In some implementations, the metric calculator module 224 can search the interaction statistics storage 234 to find or identify the number of interactions by each of the client devices 125A-N of the at least one selected subset of client devices with one content element 218A-N prior to interacting with another content element 218A-N. In some implementations, the metric calculator module 224 can search the interaction statistics storage 234 to find or identify the time durations by each of the client devices of the at least one selected subset of client devices with each associated content element 218A-N. In some implementations, the metric calculator module 224 can search the interaction statistics storage 234 to find or identify the client device attributes for each of the client devices 125A-N of the at least one selected subset of client devices. In some implementations, the metric calculator module 224 can search or identify the content element identifiers corresponding to the content elements 218A-N associated with the subset of client devices.

In some implementations, the metric calculator module 224 can compare the one or more interaction sequence metrics among different subsets of client devices identified form the clustering algorithm. In some implementations, the metric calculator module 224 can calculate the one or more interaction sequence metrics for interactions by another subset of client devices with each content element 218A-N prior or subsequent to interacting with other content elements 218A-N based on the interaction statistics. In some implementations, the metric calculator module 224 can calculate the one or more interaction sequence metrics for the interactions by the other subset of client devices with one of the identified content elements 218A-N prior or subsequent to interacting with another content element of the identified content elements 218A-N. In some implementations, the metric calculator module 224 can determine calculate an interaction sequence difference measure for a respective content element 218A-N based on the respective interaction sequence metrics of one subset of client devices for the respective content element 218A-N and the respective interaction sequence metrics for the other subset of client devices for the respective content element 218A-N. For example, the metric calculator module 224 can subtract or divide the two interaction sequence metrics for two respective subsets of client devices for interacting with one content element 218A-N prior or subsequent to interacting with another content element 218A-N to determine the respective interaction sequence difference measure.

In some implementations, the metric calculator module 224 can calculate a total number of interactions by the at least one selected subset of client devices over the content elements 218A-N of the information resource 216. In some implementations, the total number of interactions may be a sum of the number of interactions for each content element 218A-N or the selected content elements 218A-N associated with the at least one selected subset of client devices. In some implementations, the total number of interactions may be a sum of the number of interactions over a subset of the content elements 218A-N. For example, the sum of the number of interactions may be over the subset of content elements 218A-N that may be actionable. In some implementations, the metric calculator module 224 can calculate a conditional probability for each content element 218A-N based on the number of interactions for the respective content element 218A-N and the total number of interactions over all of the content elements 218A-N. The conditional probability for a given content element 218A-N may be, for example, of the following mathematical form $p(i_t|\overline{i}_{t-1})$, where $i_t$ is the interaction for i-th content element at the t−1-th sequence and $T_{t-1}$ is the interaction for content elements excluding the i-th content element at the t−1-th sequence. In some implementations, the metric calculator module 224 can generate or otherwise calculate a conditional probability matrix for each content element 218A-N based on the number of interactions for the respective content element 218A-N and the total number of interactions over all of the content elements 218A-N. In some implementations, the metric calculator module 224 can generate the conditional probability matrix using the conditional probability for each content element 215A-N. The conditional probability matrix may be, for example, n-dimensional. Using the conditional probability or the conditional probability matrix, the metric calculator module 224 can calculate the interaction sequence metric for the respective content element 218A-N.

In some implementations, the metric calculator module 224 can adjust the conditional probability or the conditional probability matrix. In some implementations, the metric calculator module 224 can an average time duration for each content element 218A-N based on the time durations of interactions by the one or more client devices 125A-N for the respective content element 218A-N. In some implementations, the metric calculator module 224 can calculate a time duration sum for each content element 218A-N over the time duration of interaction for each client device 125A-N in the at least one subset of client devices for the respective content element 218A-N. In some implementations, the metric calculator module 224 can calculate or identify a number of the one or more client devices 125A-N. In some implementations, the metric calculator module 224 can calculate the average time duration for each content element 218A-N based on the time duration sum for the respective content element 218A-N and the number of client devices 125A-N in the at least one subset of client devices. In some implementations, the metric calculator module 224 can adjust, modify, or otherwise weigh the conditional probability for each content element 218A-N based on the average time duration for the respective content element 218A-N. For example, the metric calculator module 224 can multiply the conditional probability by the average time duration to generate the interaction sequence metrics.

The metric calculator module 224 can select a subset of the one or more content elements 218A-N of the information resource 216 based on the calculated interaction sequence metrics for the content elements 218A-N. The subset of the one or more content elements 218A-N may, for example, include two of the content elements 218A and 218B identified as associated with the at least one subset of client devices on the information resource 216. In some implementations, the metric calculator module 224 can identify the subset of the one or more content elements 218A-N corresponding to the highest respective subset of interaction sequence metrics using the comparator 230. In some implementations, using the comparator 230, the metric calculator module 221 can compare the interaction sequence metrics for each content element 218A-N to identify the subset of content elements 218A-N corresponding to the highest respective subset of interaction sequence metrics. For example, the metric calculator module 224 can identify n content elements 218A-N with the top n interaction sequence metrics.

In some implementations, using the comparator 230, the metric calculator module 224 can compare the interaction sequence metric of each content elements 218A-N among another to determine whether that the interaction sequence metric differs by at least a predetermined margin. In some implementations, the metric calculator module 224 can select the subset of the one or more content elements 218A-N, responsive to determining that the respective interaction subsequence metrics for the subset of the content elements 218A-N is each greater than other interaction subsequence metrics of other content elements 218A-N by the pa-determined margin. For example, the metric calculator module 224 can determine that a first interaction sequence metric for a first content element 218A and a second interaction sequence metric for a second content element 218B is each greater than to a third interaction sequence metric for a third content element 218C by a predetermined margin. The metric calculator module 224 can select the first content element 218A and the second content element 218B based on the respective interaction sequence metrics being greater than the third interaction statistic for the third content element 218C by the predetermined margin.

In some implementations, using the comparator 230, the metric calculator module 224 can determine which range of the one or more interaction sequence metric ranges the calculated interaction sequence metric is within. The one or more interaction sequence metric ranges can be quantiles (e.g., tertiles, quartiles, deciles, etc.) or uneven predefined ranges. In some implementations, the one or more interaction sequence metric ranges may be defined using variance measures (e.g., 1-sigma, 2-sigma, etc.) of the one or more calculated interaction sequence metrics. For example, the metric calculator module 224 can calculate a variance of the calculated interaction sequence metrics. Using the calculated variance, the metric calculator module 224 can compute the standard deviation and set multiples of the standard deviations as the one or more interaction sequence metric ranges. In some implementations, the metric calculator module 224 can determine which range of the one or more interaction sequence metric ranges per client device segment.

In some implementations, the metric calculator module 224 can calculate which range of the one or more time duration ranges the time durations of interacting with the respective content element 218A-N is within. In some implementations, the metric calculator module 224 can calculate which range of the one or more time duration ranges the calculated average time duration of interactions with the respective content element 218A-N is within. In some implementations, the metric calculator module 224 tan calculate one or mote numbers of time intervals between the interactions by each of the subset of client devices with one content element 218A-N prior or subsequent to interacting with another content element 218A-N based on the plurality of time durations corresponding to the subset of client devices. The one or more time duration ranges or intervals may be quantiles (e.g., tertiles, quartiles, deciles, etc.) or uneven predefined ranges. In some implementations, the one or more time duration ranges may be defined using variance measures (e.g., 1-sigma, 2-sigma, etc.) of the time durations of interacting with the respective content element 218A-N. In some implementations, the metric calculator module 224 can assign the time duration range for the respective content element 218A-N by dividing the calculated average time duration for the respective content element 218A-N by a predefined quantile.

The graph generator module 226 can generate a graph element using the one or more calculated interaction sequence metrics for the at least one subset of client devices. In some implementations, the graph element may be a graphical user interface for the application 210 or another application running on the computing device (e.g., content administrator device 145). In some implementations, the graph element may be another information resource including DOM tree elements to display a graph representing the calculated interaction sequence metrics. In some implementations, the graph element may be an overlay content element inserted in the information resource 216. The graph element can include a graph. The graph may include a set of nodes, a set of paths, and a set of loops. The graph may be, for example, acyclic or cyclic, directed or undirected, mixed, or be of any combination and form. The graph may be a data structure (e.g., array, list, linked list, heap, table, tree, matrix, etc.) including the set of nodes, the set of paths, and the set of loops arranged or indexed by the respective content element identifier. Each node of the graph may correspond to a content element 218A-N. Each path of the graph may be connected from one node to another node, and may indicate the one or more calculated interaction sequence metrics for the interactions by each of the client devices 125A-N of the at least one selected subset of client devices with one content element 218A-N prior or subsequent to another content element 218A-N. Each loop of the graph may be a self-referential edge connected from one node to itself, and may correspond to the time durations of interacting with the respective content element 218A-N corresponding to the node. In some implementations, the graph generator module 226 can generate a plurality of graph elements, each including a set of nodes, a set of paths, and a set of loops, using the interaction sequence metrics per client device subset. In some implementations, the graph generator module 226 can generate the graph element at a predefined time interval. For example, the resource request module 212 may receive the one or more interaction statistics 236A-N periodically. Each the one or more interaction statistics 236A-N is received, the metric calculator module 224 can calculate the interaction sequence metrics and the graph generator module 226 can generate the graph element.

In some implementations, the graph generator module 226 can generate or create the graph. In some implementations, the graph generator module 226 can instantiate a canvas element as the graph element on the DOM tree element generated. In some implementations, for each node corresponding to the respective content element 218A-N associated with the at least one selected subset of client devices, the graph generator module 226 can modify the canvas element to include a mark. The mark can be of any shape. For example, the graph generator module 226 can invoke the function "arc( )" to draw a circle or "fillRect( )" to draw a rectangle onto the canvas element. In some implementations, for each path corresponding to the one or more calculated interaction sequence metrics for the respective content element 218A-N, the graph generator module 226 can modify the canvas element to include a line from one node to another. In some implementations, for each loop corresponding to the time durations for interacting with the respective content element 218A-N, the graph generator module 226 can modify the canvas element to include a line from one node to itself. For example, in drawing the line onto the canvas for the path or the loops, the graph generator module 226 can invoke the "arcTo( )," "lineTo( )," "quadraticCurveTo( )," or "bezierCurveTo( )" function to draw a lien from one node to another or itself. In some implementations, the graph generator module 226 can instantiate any number of DOM tree elements or invoke any number of functions to generate the graph or the graph element.

In some implementations, the graph generator module 226 can insert the graph element into the information resource 216 over the one or more content elements 218A-N. Visually, the graph element may be, for example, transparent so that the set of nodes, the set of paths, and the set of loops appear visible on a layer (e.g., z-level) above with the one or more content elements 218A-N on the information resource 216. In some implementations, the graph generator module 226 can identify the content element 218A-N corresponding to the respective node based on the respective content element identifier for the content element 218A-N. For example, the graph generator module 226 can access the data structure for the graph, identify the first content element identifier, and determine that the first content element 218A corresponds to the first node based on the first content element identifier. In some implementations, the graph generator module 226 can identify which of the one or more content elements 218A-N are actionable. In some implementations, the graph generator module 226 can identify which of the one or more content elements 218A-N are non-actionable. In some implementations, the graph generator module 226 can insert the graph element into the information resource 216 over the one or more content elements 218A-N identified as actionable.

In some implementations, the graph generator module 226 can identify a position property of the content element 218A-N. The position property can include the x-y coordinates on the information resource 216 and dimensions of the respective content element 218A-N. In some implementations, the graph generator module 226 can set a position property of the nodes of the graph to the position property of the respective content element 218A-N. In some implementations, the graph generator module 226 can set a position property of each node to overlap or be adjacent to the respective content element 218A-N. For example, if node "A" corresponds to content element 218A, the graph generator module 226 can set the position property of the node within the dimensions of the respective content element 218A-N. In some implementations, the graph generator module 226 can set a start point of the path for the one or more calculated interaction sequence metrics for the respective content element 218A-N to the position property of the respective content element 218A-N. In some implementations, the graph generator module 226 can set an end point of the path for the one or more calculated interaction sequence metrics for the respective content element 218A-N to the position property of the other content elements 218A-N. For example, if a path corresponds to an interaction sequence metric for interacting with the first content element 218A prior to interacting with the second content element 218B, the graph generator module 226 can set the start point of the path to a coordinate using the position property of the first content element 218A or the corresponding node and set the end point of the path to a coordinate using the position property of the second content element 218B or the corresponding node. In some implementations, the graph generator module 226 can include or insert a marker at the end point of the path to indicate direction of the one or more interaction sequence metrics. For example, the graph generator module may modify the canvas element for the graph element to insert an arrow head at the end point.

In some implementations, the graph generator module 226 can set a visual property of each path of the graph of the graph element based on the respective one or more calculated interaction sequence metrics. The visual property may include, for example, color, width, dashes, and size, among others. In some implementations, the graph generator module 226 can set the visual property of each path of the graph element based on the identifier respective interaction sequence metric range. For example, if the interaction sequence metric for a specific path may be 0.9, the graph generator module 226 may set the line for the path to be bolder than if the interaction sequence metric were 0.25. In some implementations, using the comparator 230, the graph generator module 226 can compare the one or more interaction sequence metrics among the one or more content elements 218A-N to one another interaction sequence metric. In some implementations, the graph generator module 226 can determine that the one or more interaction sequence metrics is greater than other interaction sequence metrics by at least a predetermined margin. In some implementations, using the comparator 210, the graph generator module 226 can set the visual properly of the respective path different from the visual property of the other respective path, responsive to determining that the respective interaction sequence metric is greater than the other respective interaction sequence metric by at least the predetermined margin.

In some implementations, the graph generator module 226 can generate the graph for multiple subsets of client devices. In some implementations, the graph for the multiple subset of client devices may be to compare the calculated interaction sequence metrics among the multiple subsets of client devices. In some implementations, the graph generator module 226 can set the visual property of each path, each node, or each loop of the graph based on the calculated interaction sequence difference measures among the multiple subsets of client devices. For example, an interaction sequence metric for one subset of client devices may be higher than the respective interaction sequence metric for another subset of client devices. This may indicate that one of the content elements 218A-N is more frequented by one subset of client devices than the other subset of client devices. In this example, the graph generator module 226 may set the visual properties of the paths and nodes to a specified visual property (e.g., different color, different thickness, different fill pattern, etc.) than the default to indicate the difference in the interaction sequence metrics between the two subsets of client devices.

In some implementations, the graph generator module 226 can generate a set of loops for each node based on the time duration of interactions with the respective content element 218A-N. In some implementations, the graph generator module 226 can generate the set of loops based on the time duration range or interval for the time durations of interactions by each of the client devices 125A-N of the at least one selected subset of client devices with the respective content element 218A-N. For example, the one or more time duration ranges may be n buckets. In this example, the graph generator module 226 can identify the number of loops to generate based on the bucket the time duration for interactions with the respective content element 218A-N is within. In some implementations, the graph generator module 226 can set a start point and end point of each loop for the respective content element 218A-N based on the position property of the respective content element 218A-N. In some implementations, the graph generator module 226 can set the start point of a loop based on the end point of another loop on the node.

In some implementations, the graph generator module 226 can insert descriptors into the graph element. Example of descriptors may include text, hyperlinks, and images, among others. Each descriptor may correspond to a content element 218A-N and be positioned over or adjacent to the node corresponding to the respective content element 218A-N on the graph. The descriptor can include a content element identifier, time durations, interaction statistics 236A-N, time range, or the interaction sequence metric, among others. In some implementations, the graph generator module 226 can insert a text element into the graph. The text element may correspond to a content element 218A-N and be positioned over one of the nodes corresponding to the content element 218A-N. In some implementations, the text element can include the content element identifier corresponding to the content element 218A-N. In some implementations, the graph generator module 226 can include a hyperlink in the text element. The hyperlink may include a landing information resource included in the respective content element 218A-N.

In some implementations, the graph generator module 226 can insert the graph element as an overlay interface element on the information resource 216 or another information resource. The overlay interface element can include the graph including the set of nodes, the set of paths, and the set of loops. In some implementations, the graph generator module 226 can generate the overlay interface element based on position properties of each content element 218A-N of the information resource 216. In some implementations, the graph generator module 226 can identify a size of the information resource 216 or a viewport of the application 210. In some implementations, the graph generator module 226 can set the overlay interface element to a size smaller than the size of the information resource 216. In some implementations, the graph generator module 226 can set the overlay interface element to the size smaller than the viewport of the application 210 on a display of the content administrator device 145.

In some implementations, the graph generator module 226 can calculate or identify a coordinate for each node proportional on the overlay interface element as to the position property of the respective content element 218A-N on the information resource 216. In some implementations, the graph generator module 226 can calculate an offset coordinate value based on a position property of the overlay interface element on the information resource 216. In some implementations, the graph generator module 226 can adjust or modify the coordinate for each node by the calculated offset. For example, if the overlay interface element is set to 25% the size of the information resource 216, the graph generator module 226 can set the coordinate of the node corresponding to a respective content element 218A-N to 25% of the position property of the respective content element 218A-N, plus any offset to account for position of the overlay interface element on the information resource 216. In some implementations, the graph generator module 226 can set the start point and the end point of each path and each loop based the size of the overlay interface element and the adjusted coordinate for each node. In some implementations, the graph generator module 226 can identify the adjusted coordinate for each node. In some implementations, the graph generator module 226 can set the start point of a path to the coordinate of the corresponding node for the interaction sequence metric. In some implementations, the graph generator module 226 can set the end point of the path to a coordinate of another corresponding for the interaction sequence metric. In some implementations, the graph generator module 226 can set the start point and the send point of a loop based on the coordinate of the corresponding node for the interaction sequence metric for the respective content element 218A-N.

In some implementations, the graph generator module 226 can instantiate a graphical user interface to insert the graph element. In some implementations, the graph generator module 226 can instantiate another information resource different from the information resource 216 to insert the graph element. For example, the graph generator module 226 can automatically generate Hypertext Markup Language (HTML) code including computer-executable instructions to render and display the graph. In this example, the graph generator module 226 can invoke the function "window.open( )" including the address of the HTML, code to instantiate and open another browser window in the application 210. The rendering engine 214 can render and display the information resource 216 including the one or more content elements 218A-N and the graph element. In some implementations, the rendering engine 214 can display the graph element as the overlay interface element on the information resource 216. In some implementations, the rendering engine 214 can display the graph element as the transparent overlay over the one or more content elements 218A-N of the information resource 216. In some implementations, the rendering engine 214 can display the marks over the one or more content elements 218A-N on the information resource 216. In some implementations, the rendering engine 214 can dynamically update the rendering and displaying of the graph element. For example, if the metric calculator module 224 or the graph generator module 226 reprocess the updated interaction statistics 236A-N received from the data processing system 110, the rendering engine 214 can re-render and display the updated graph element.

The functionalities of the application 210, the resource request module 212, the rendering engine 214, the information resource 216, the one or more content elements 218A-N the interaction statistics visualization script 220, the metric calculator module 224, the graph generator module 226, the counter 228, the comparator 230, the timer 230, the interaction statistics storage 232, and the interaction statistics 236A-N may be repeated over time. In this way, the interaction statistics visualization script 220 may dynamically visualize and display the interaction statistics 236A-N such as the number of interactions and time duration of the interactions by the one or more client devices 125A-N or the identified subsets of client devices for each of the content elements 218A-N by generating the graph element. The interaction statistics visualization script 220 may thus improve the display functionality of the computing device and enhance human-computer interactions (HCI) with the application 210.

Figure 3A:
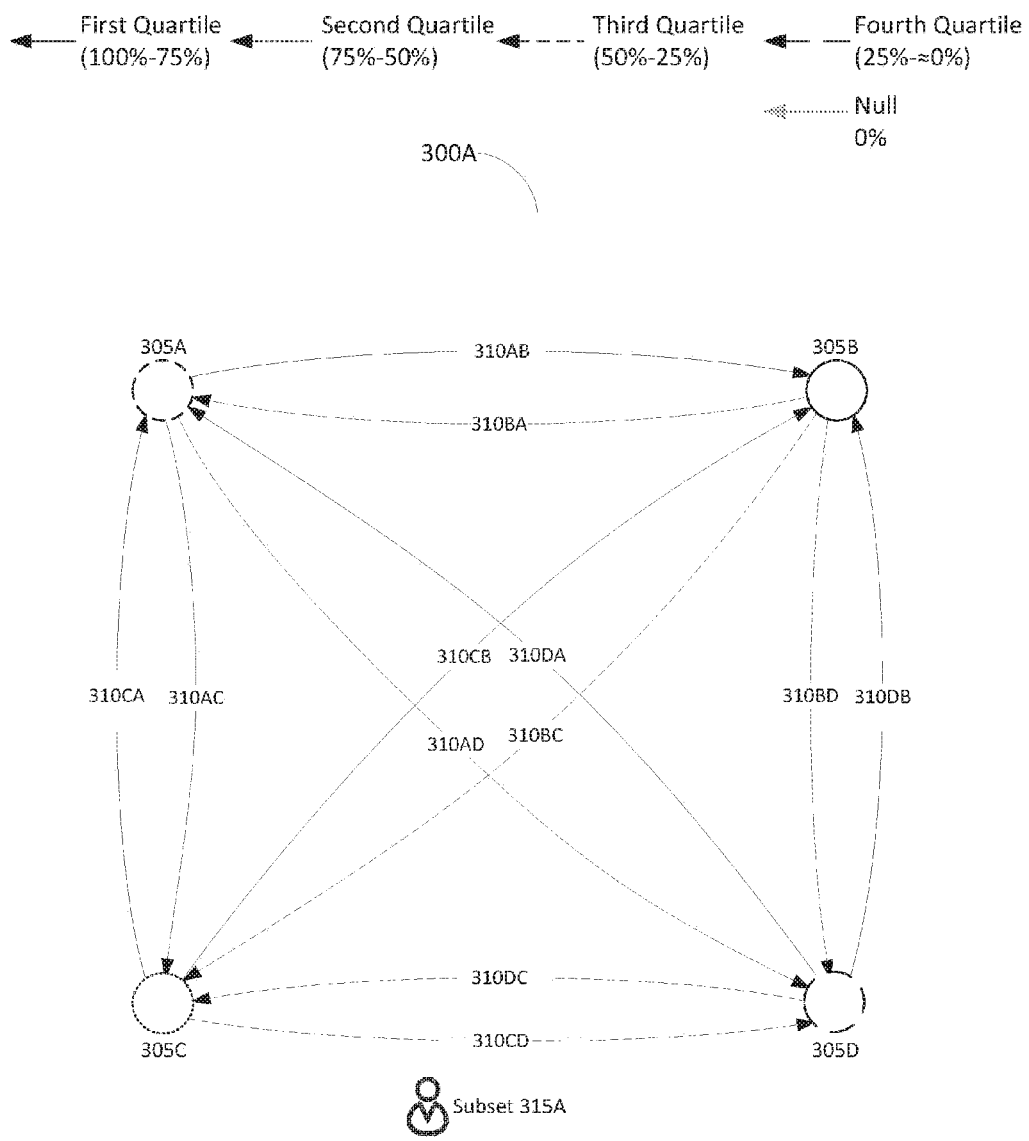
FIGS. 3A and 3B each area block diagram depicting a graph element indicating the sequences and rates of interaction among the content elements on the information resource for a client device segment, according to an illustrative implementation.
Figure 3B:
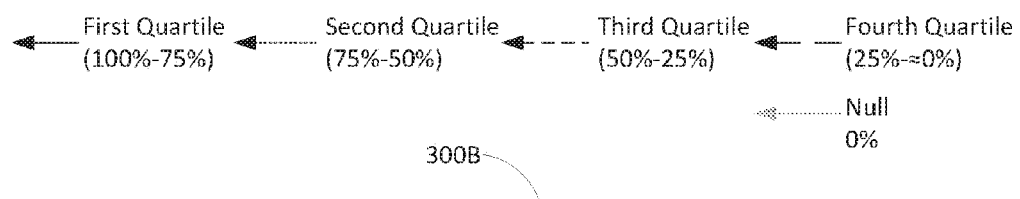
Figure 3B:
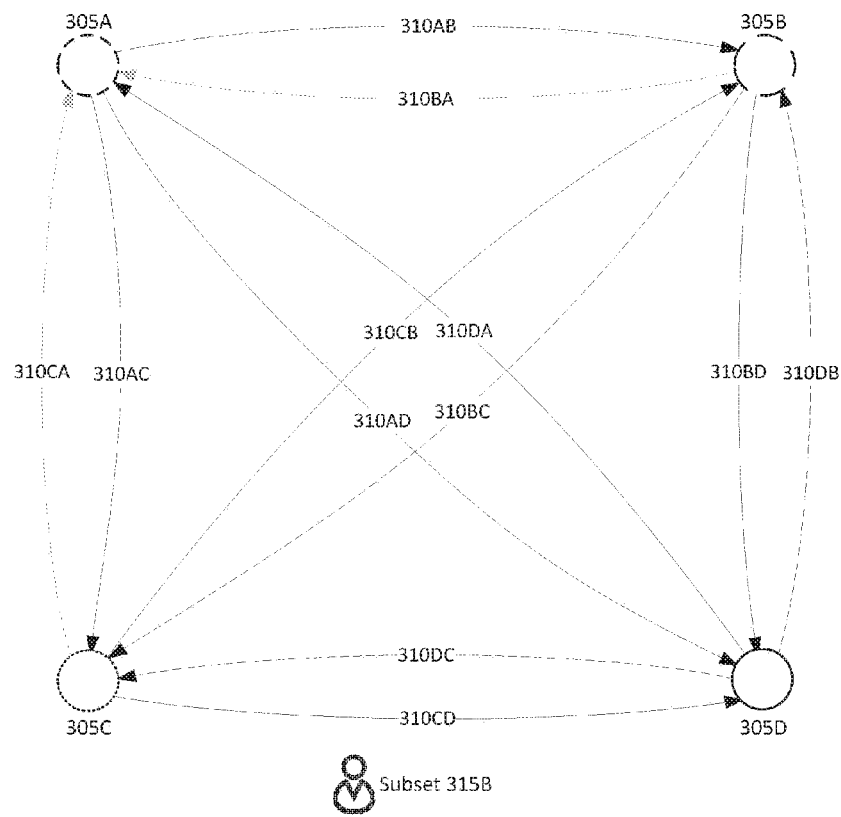

Referring to FIGS. 3A and 3B, FIGS. 3A and 3B each are a block diagram depicting one implementation of a graph element 300A and 300B respectively indicating the sequences and rates of interaction among the content elements 218A-N on the information resource for a client device segment. The examples depicted in FIGS. 3A and 3B may be for the interaction sequence metrics among the content elements 218A-E of the information resource 218 for two subsets of client devices 315A and 315B. Graph elements 300A and 300B may each include four nodes 305A-D and eight directed paths 310. The four nodes 305A-D may correspond to four of the actionable content elements 218A, 218B, 218D, and 218E of the information resource 216 respectively. The four nodes 305A-D may be dolled based on the quartile the corresponding time duration is within. The eight directed paths 310 may correspond to the interaction sequence metrics among the four actionable content elements 218A, 218B, 218D, and 218E of the information resource 216 as depicted in FIGS. 3A and 3B. The eight directed paths 310 may be dotted based on the quartile the corresponding interaction sequence metric is within.

As depicted in the example of FIG. 3A, the interactions with the four actionable content elements 218A, 218B, 218D, and 218E by the first subset of client devices 315A may encompass all permutations of possible interactions among the four actionable content elements 218A, 218B, 218D, 218E. This may be indicated by dotted lines of the eight directed paths 310 corresponding to at least the fourth quartile. Moreover, as indicated in the dotted lines on the four nodes 305A-D with node 305B solid, the subset of client devices 315A may spend the most time in interacting with the second content element 218B. FIG. 3B depicts the interactions with the four actionable content elements 218A, 218B, 218D, and 218E by a second subset of client devices 315B. In contrast to the subset 315A of FIG. 3A, the interactions with the four actionable content elements 218A, 218B, 218B, and 218E by the second subset of client devices 315B may encompass a subset of the permutations of potential interactions among the four content elements 218A, 218B, 218D, and 218E on the information resource 216. For example, none of the client devices 125A-N in the second subset of client devices 315B may have interacted with fourth content element 218D (corresponding to node 305C) prior to interacting with the first content element 218A (corresponding to node 305A) and with the second content element 218B (corresponding to node 305B) prior to interacting with the first content element 218A (corresponding to node 305A). Furthermore, the relative time duration of interactions by the subsets of client devices 315A and 315B may differ among the content elements 218A, 218B, 218C, and 218D as seen in the dotted lines around nodes 305A-D, with the second content element 218B (node 305B) having the greatest time duration for the first subset of client devices 315A and the fourth content element 218D (node 305C) having the greatest time duration for the second subset of client devices 315B.

Figure 3C:
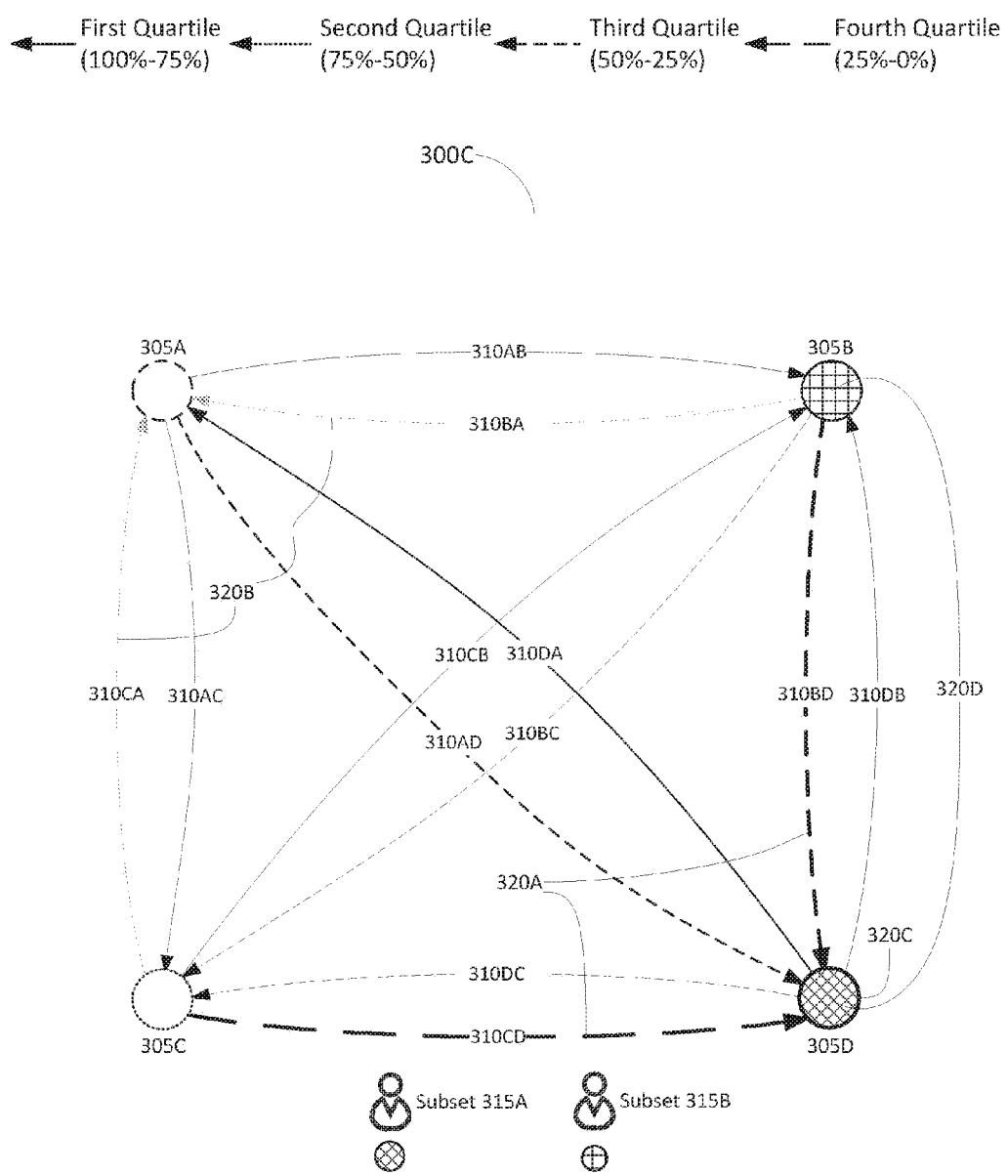
FIG. 3C is a block diagram depicting the graph element comparing the sequences and rates of interaction among the content elements for two client device segments, according to an illustrative implementation.

Referring to FIG. 3C, FIG. 3C is a block diagram depicting one implementation of the graph element 300C comparing the sequences and rates of interaction among the content elements for two client device segments. The graph element 300C may depict a juxtaposition or comparison of the interaction sequence metrics between the two subsets of client devices 315A and 315B. In the example depicted in FIG. 3C, the graph generator module 226 may have set the visual properties of some of the nodes 305B and 305D and paths 310BA, 310CA, 310AD, 310BD, and 310CD to highlight differences in the interaction sequence metrics between the two subsets of client devices 315A and 315B. To this end, the graph generator module 226 may have set the visual properties of the paths 310BD, and 310CD to bold 320A and the paths 310CA and 310BA to gray to indicate difference in interaction sequence metrics among the two subsets of client devices 315A and 315B. The graph generator module 226 may have increased the thickness 320C of the outer line of the circle for node 305D to indicate the difference in time duration of interaction among the two subsets of client devices 315A and 315B. Furthermore, the graph generator module 226 may have shaded the circle for the nodes 305B and 305D to indicate which content element (218B and 218E) is most frequented by the two subsets of client devices 315A and 315B.

Figure 3D:
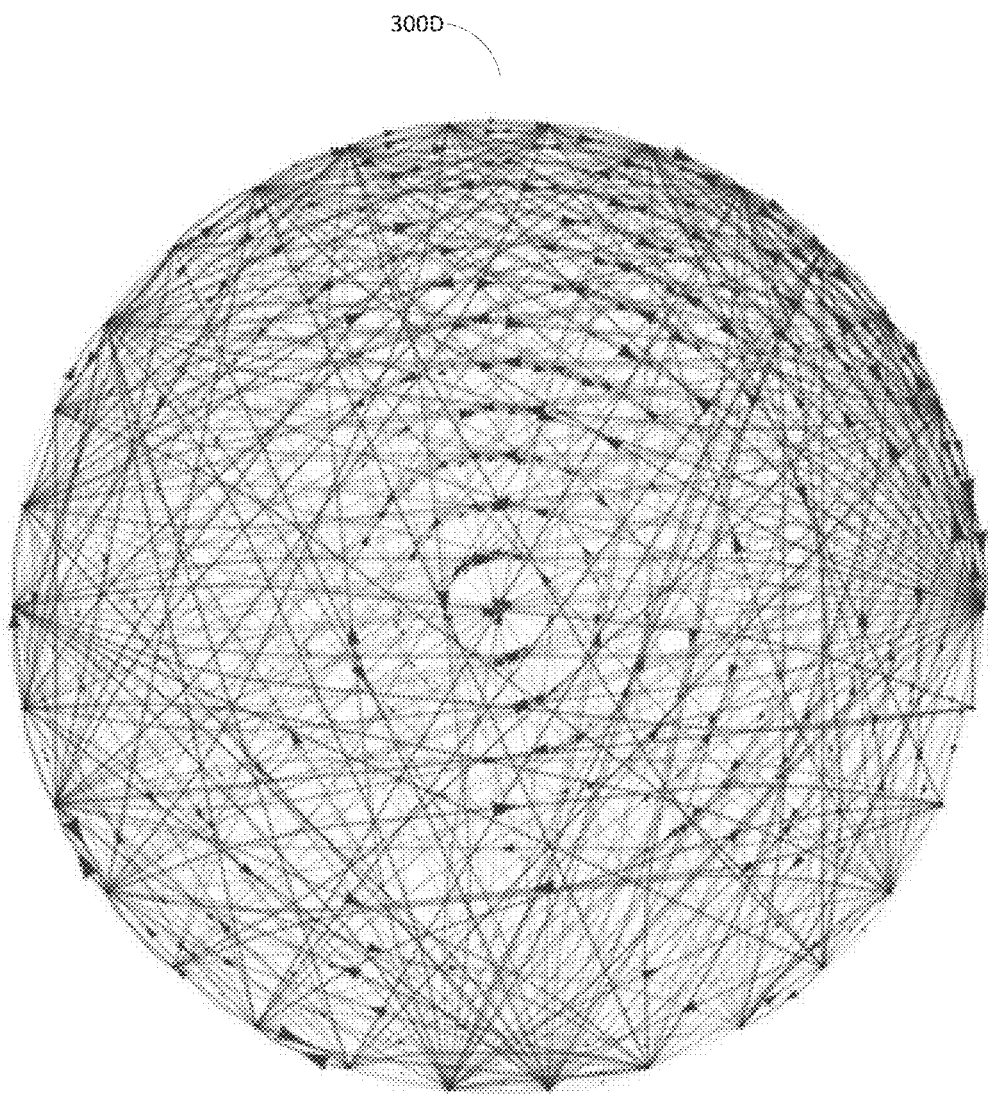
FIG. 3D is a block diagram depicting another graph element indicating the sequences and rates of interaction among a multitude of content element on the information resource for another client device segment, according to an illustrative implementation.

Referring to FIG. 3D, FIG. 3D is a block diagram depicting one implementation of another graph element 300D indicating the sequences and rates of interaction among a multitude of content element on the information resource for another client device segment. Graph element 300D may depict the traversal of a subset of client devices from one content element to another content element in one or more information resources including a multitude of content elements. The thicknesses of each path may indicate the interaction sequence metric for interacting with one content element prior or subsequent to interacting with another content element.

Figure 3E:
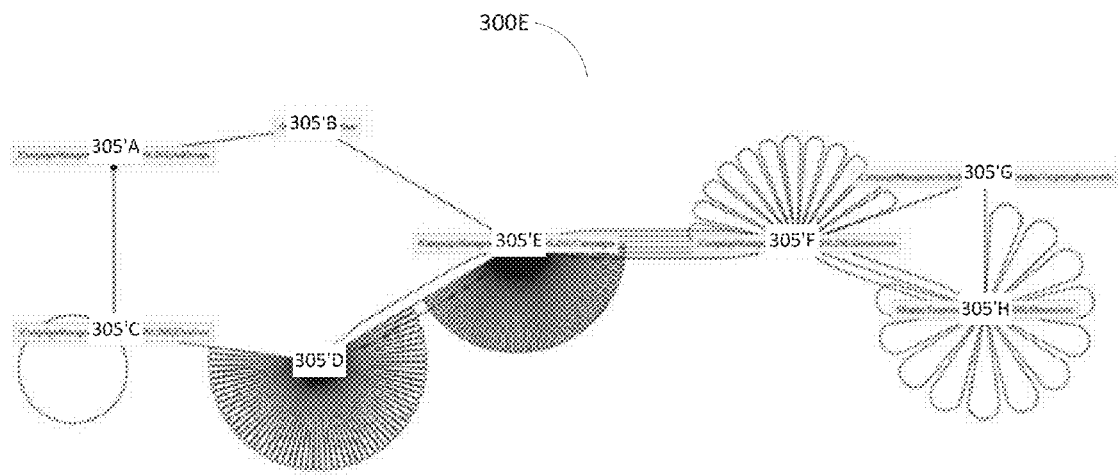
FIG. 3E is a block diagram depicting another graph element indicating the sequences and rates of interaction among the content elements on the information resource for another client device segment, according to an illustrative implementation.

Referring to FIG. 3E, FIG. 3E is a block diagram depicting one implementation another graph element 300E indicating the sequences and rates of interaction among the content elements on the information resource for another client device segment. The graph element 300E may include eight nodes 305'A-H corresponding to eight content elements 218A-H respectively. At five of the nodes 305'D, 305'E, 305'F, and 305'H, there may be a number of loops indicating the time durations or number of interactions by the subset of client devices at the corresponding content elements.

Figure 3F:
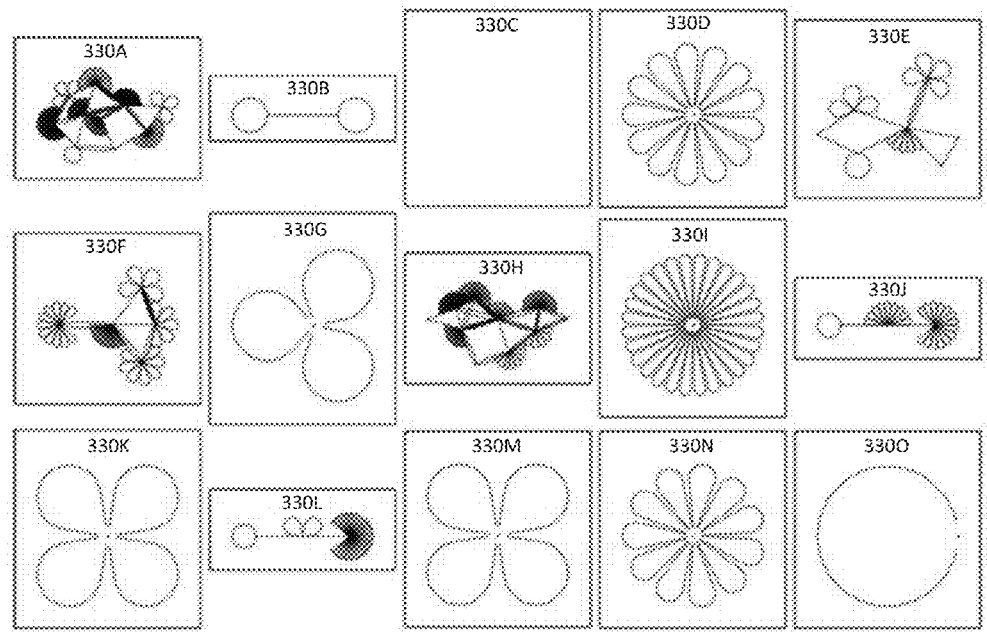
FIG. 3F is a block diagram depicting various graph elements indicating the sequences and rates of interaction among the content elements on the information resource for various client device segment, according to an illustrative implementation.

Referring to FIG. 3F, FIG. 3F is a block diagram depicting multiple implementations of various graph elements 330A-330O indicating the sequences and rates of interaction among the content elements on the information resource for various client device segment. The graph elements 330A-330O may each include a set of nodes, a set of paths, and a set of loops and may correspond to a different subset of client devices for interactions on the content elements on various information resources. In each example, the graph generator module 226 may have generated the graph by applying various graphing techniques to the interaction sequence metrics calculated for various subsets of client devices identified using the clustering algorithm.

Figure 4:
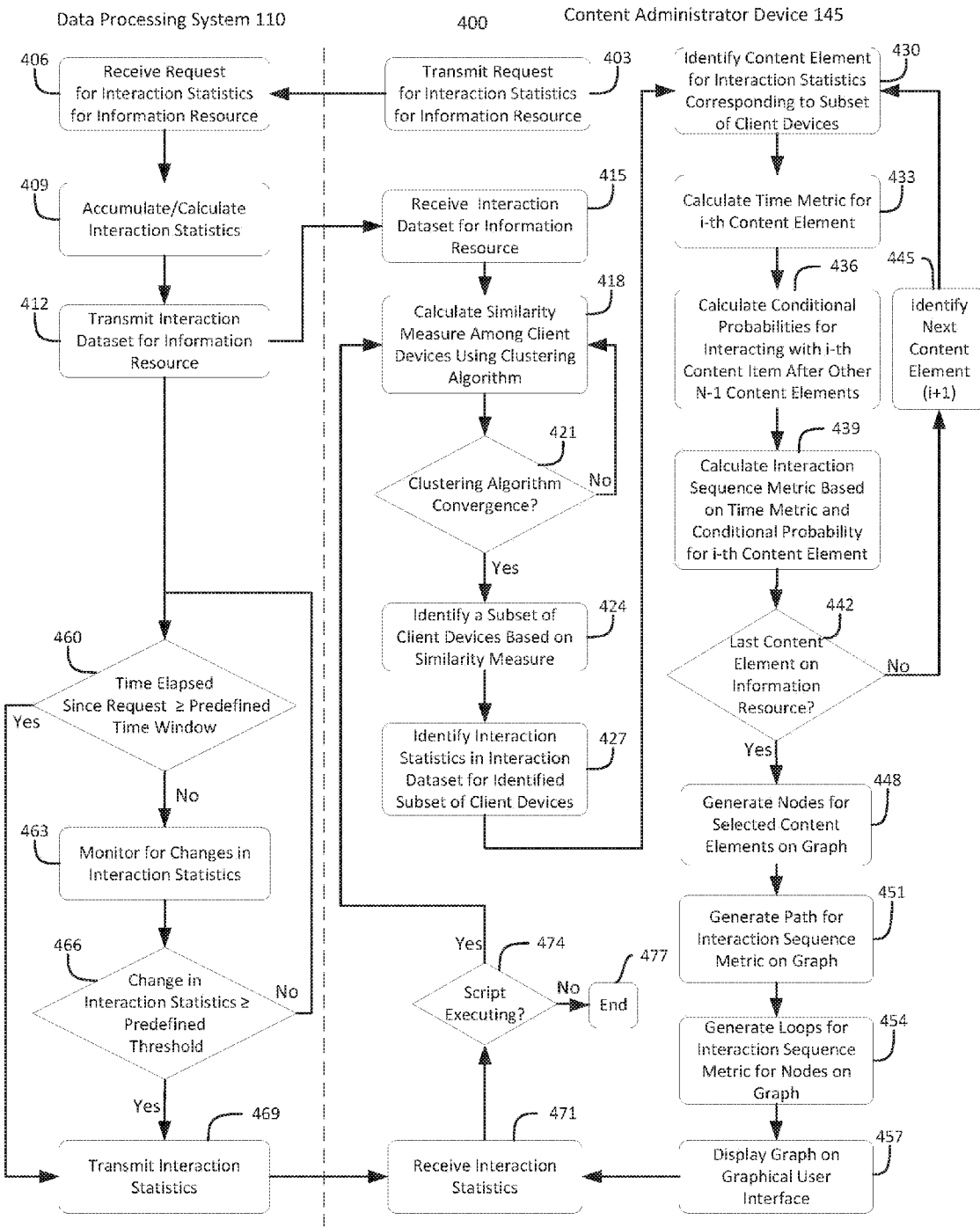
FIG. 4 is a flow diagram depicting rendering webpage interaction statistics data over graphical user interfaces in a computer network environment, according to an illustrative implementation.

FIG. 4 is a flow diagram depicting rendering web page interaction statistics data over graphical user interfaces in a computer network environment, according to an illustrative implementation. The functionality described herein described in the method 400 can be performed by data processing system 110, content provide devices 115A-N, content publisher devices 120A-N, client devices 125A-N, and the content administrator device 145, or any one or more components or modules of the system 100 shown in FIG. 1 or of the system 200 in FIG. 2.

In brief overview, a computing device (e.g., content administrator device 145) can transmit a request for interaction statistics for an information resource (ACT 403). The data processing system (e.g., data processing system 110) can receive the request for interaction statistics for the information resource (ACT 406). The data processing system can accumulate or calculate interaction statistics (ACT 409). The data processing system can transmit the interaction dataset with the interaction visualization script (ACT 412).

The computing device can receive the interaction dataset with the interaction visualization script (ACT 415). The computing device can calculate a similarity measure among the client devices using a clustering algorithm (ACT 418). The computing device can determine whether the clustering algorithm has converged (ACT 421). If the clustering algorithm has converged, the computing device can identify a subset of client devices based on the similarity measure (ACT 424). The computing device can identify interaction statistics in the interaction dataset for the identified subset of client devices (ACT 427). The computing device can identify the content element for the interaction statistics (ACT 430). The computing device can calculate the time metric for the i-th content element (ACT 433). The computing device can calculate the conditional probabilities for interacting with the i-th content element prior or subsequent to interacting with the other N-I content elements (ACT 436). The computing device can calculate the interaction sequence metric based on the interaction time duration and the calculated conditional probabilities for the i-th content element (ACT 439). The computing device can determine whether the i-th content element is the last content element on the information resource (ACT 442). If the i-th content element is not the last content element on the information resource, the computing device can identify the next content element (ACT 445). If the i-th content element is the last content element on the information resource, the computing device can generate nodes corresponding to selected content elements for a graph element (ACT 448). The computing device can generate paths corresponding to the interaction sequence metrics among the content elements for the graph element (ACT 451). The computing device can generate loops for the interaction sequence metrics for the graph element (ACT 454). The computing device can display the information resource (ACT 457).

The data processing system can determine whether the time elapsed since the request for interaction statistics is greater than or equal to a predefined time threshold (ACT 460). If the time has elapsed since the request for interaction statistics is less than the predefined time threshold, the data processing system can monitor for changes in interaction statistics (ACT 463). The data processing system can determine whether the change in interaction statistics is greater than or equal to a predefined statistic threshold (ACT 466). If the time has elapsed since the request for interaction statistics is greater than the predefined time threshold or the change in interaction statistics is greater than the predefined statistic threshold, the data processing system can transmit updated interaction statistics (ACT 469). The computing device can receive the updated interaction statistics (ACT 471). The computing device can determine whether the script is executing (ACT 474). If the script is not executing, the computing device can terminate (ACT 477).

In further detail, a computing device (e.g., content administrator device 145) can transmit a request for interaction statistics for an information resource (ACT 403). The data processing system (e.g., data processing system 110) can receive the request for interaction statistics for the information resource (ACT 406). The request for interaction statistics can include an information resource identifier or content element identifier. The information resource identifier can correspond to an information resource (e.g., webpage) to be displayed on the computing device. The information resource identifier can include, for example, a resource address (e.g., Uniform Resource Locator (URL)) or any alphanumerical identifier. The content element identifier can correspond to any of the one or more content elements on the information resource. The content element identifier can include, for example, a resource address (e.g., URL) or any alphanumerical identifier. In some implementations, the request for interaction statistics can further include a specified time threshold. The one or more interaction statistics can include click-through rate (CTR), hover-over rate, scroll-over rate, impression rate, and key-press rate, among others.

The data processing system can accumulate or calculate interaction statistics (ACT 409). The data processing system can receive a ping or interaction indicator indicating interaction on the information resource or the content element of the information resource from a plurality of client devices. The information resource or the content element transmitted to the client device can include a pingback script. Once loaded onto the client device, the pingback script can transmit a ping or an interaction identifier indicating interaction by the client device on the respective content element. The ping or file interaction indicator can include an information resource identifier, a content element identifier, an interaction type, a client device identifier, timestamp, and other metadata. The content element identifier can correspond to the content element upon which the client device detected an event on. The interaction type can identify which event was detected by the client device from an input-output device such as a mouse, keyboard, and touchscreen among others. The detected event may include, for example, click, touch, hover over, hover out, key press, mouse wheel, and scrolling, among others. The client device can correspond to a unique alphanumerical identifier or a device address (e.g., IP or MAC address) corresponding to the client device. The timestamp can include the time at which the event was detected by the client device. Examples of metadata included in the ping or the interaction indicator may include a location identifier, device type identifier, application identifier, and account identifier, among others.

Upon receiving the ping or interaction indicator, the data processing system can save, update, or otherwise write onto the interaction log of the database. In some implementations, the data processing system can create or generate an entry including the information resource identifier, the content element identifier, the interaction type, the client device identifier, and the timestamp from the ping or the interaction indicator. In some implementations, the data processing system can process the fields of the ping or the interaction indicator prior to recording the fields onto the interaction log of the database. In some implementations, the data processing system can generate an entry using a subset of the fields in the ping or the interaction indicator. For example, the data processing system can record the information resource identifier, the content element identifier, and timestamp, while not saving the client device identifier and the interaction type. In some implementations, the data processing system can identify a range of times corresponding to the time stamp and then record the corresponding range of time for the entry in the interaction log.

The data processing system can maintain the interaction log by one or more client device segments. In some implementations, the data processing system can save, update, or otherwise write the ping or the indication indicator onto the interaction log of the database arranged by the one or more client device segments. The one or more client device segments may be based on the location identifier, device type identifier, and the account identifier included in the metadata of the ping or the interaction indicator. In some implementations, the data processing system can save, update, or otherwise write the ping or the indicator into separate data structures in the interaction log of the database. For example, if the data processing system receives one ping with the device type identifier "mobile phone" and another ping with the device type identifier "laptop," the data processing system can append one entry for the ping with the device type identifier "mobile phone" onto a data structure for mobile phones on the interaction log and append another entry for the ping with the device type identifier "laptop" onto a separate, corresponding data structure for laptops on the interaction log of the database.

The data processing system can transmit the interaction dataset with the interaction visualization script (ACT 412). The data processing system can transmit the interaction dataset with the interaction visualization script to the content provider devices, the content publisher devices, the client devices, or the computing device associated with the request for interaction statistics. In some implementations, the data processing system can transmit the interaction statistics visualization script or the interaction dataset without the information resource or the content element to the content provider devices, the content publisher devices, the client devices, or the computing device. In some implementations, the data processing system can transmit the interaction statistics visualization script to one of the content provider devices or the content publisher devices associated with the request for interaction statistics. Receipt of the interaction statistics visualization script can cause the respective content provider device or the content publisher device to insert the interaction statistics visualization script into the information resource or the content element and transmit the information resource or the content element with the interaction statistics visualization script to any one of the client devices or the computing device. In some implementations, the data processing system can transmit the interaction statistics visualization script or the interaction dataset with the interaction visualization script including the one or more interaction statistics, responsive to the data processing system determining that the time elapsed since receiving the request for interaction statistics is greater than or equal to the predefined time threshold or determining that the one or more interaction statistics has changed by the predefined statistic threshold.

In some implementations, the data processing system can retrieve, access, or receive the one or more interaction statistics calculated by the data processing system corresponding to the information resource identifier or the content element identifier. In some implementations, the data processing system can transmit a request to the data processing system or the database for the one or more interaction statistics corresponding to the information resource identifier or the content element identifier. In some implementations, the data processing system can subsequently receive the one or more interaction statistics from the data processing system or the database. The data processing system can insert, embed, append, or otherwise add bit interaction statistics visualization script into the information resource or the content element.

The computing device can receive the interaction dataset with the interaction visualization script (ACT 415). The computing device can subsequently receive, via the network interface, from the data processing system, the interaction statistics visualization script without the information resource. In some implementations, the interaction statistics visualization script may have been pre-installed on the computing device. In some implementations, the computing device can subsequently receive, via the network interface, the interaction metrics to be stored at the interaction statistics storage. In some implementations, the computing device can subsequently receive, via the network, from the data processing system, the information resource or the content element. The information resource can include one or more content elements and the interaction statistics visualization script, including the one or more interaction statistics. Each of the one or more content elements can correspond to a node of a document object model (DOM) tree and a cascading style sheets (CSS) style generated by the application. In some implementations, the content element can include the interaction statistics visualization script. Each of the one or more content elements can correspond to a content element identifier. In some implementations, a subset of the one or more content elements can be actionable, while another subset of the one or more content elements may be non-actionable. For example, a body text content element on the information resource may not have any instructions executed responsive to an event (e.g., click, key press, etc.) and may thus be considered non-actionable. Each of the one or more content elements may be a different type of content element. For example, one content element may be an inline frame element, while another content element may be an image element.

Each of the one or more interaction statistics can correspond to a respective content element of the one or more content elements. In some implementations, the one or more interaction statistics may be for a plurality of information resources. The one or more interaction statistics can include a number of interactions by the client devices with the respective content element prior or subsequent to interacting with other content elements of the information resource. In some implementations, the one or more interaction statistics can include time duration for interacting with the respective content element by the client devices. In some implementations, the one or more interaction statistics can correspond to at least one client device segment or client device attribute corresponding to a subset of the one or more client devices. In some implementations, the one or more interaction statistics can include a number of interactions by a subset of client devices with one content element prior or subsequent to interacting with other content elements and time duration interacting with content element by the subset of client devices. In some implementations, the number of interactions and the time durations may be stored as a data structure (e.g., array, list, linked list, heap, table, tree, matrix, etc.) arranged or otherwise indexed by content element identifier or client device segment identifier.

The computing device can receive the information resource, the one or more content elements, the interaction statistics visualization script, the one or more interaction statistics repeatedly. For example, the application may have loaded and may still display the information resource on the display of the computing device. Subsequently, the computing device can receive, from the data processing system, a second or updated version of the interaction statistics visualization script and the one or more interaction statistics. In some implementations, the computing device can, at a first time, receive the information resource or the content element. In some implementations, the computing device can, at a second time subsequent to the first time, receive the second version or updated version of the information resource, the content elements, the interaction statistics visualization script, or the interaction statistics. In some implementations, the computing device can access the timer to retrieve time. In some implementations, using the timer, the computing device can transmit a request for interaction statistics, responsive to determining that the time elapsed since the time of receiving the last interaction statistics has elapsed by at least a predefined time threshold. In some implementations, the computing device can receive the updated interaction statistics. In some implementations, the computing device can receive the one or more interaction statistics, responsive to the data processing system determining that the interaction data has changed by at least a predefined statistic threshold between the second time and the first time. In some implementations, the computing device can receive the one or more interaction statistics, responsive to the data processing system determining that a predefined time threshold has lapsed between the first time and the second time.

The computing device can calculate a similarity measure among the client devices using a clustering algorithm (ACT 418). The computing device can calculate or determine, using a clustering algorithm, one or more similarity measures among one or more subsets of client devices from the one or more client devices based on the interaction dataset. Examples of the clustering algorithm can include k-means clustering, density-based spatial clustering, expectation-maximization (EM) clustering, principal component analysis (PCA), and linear discriminant analysis (LDA), among others. The one or more similarity measures can be, for example, an expected value, a variance, or a distance measure (e.g., Euclidean, Mahalanobis, Manhattan, Chebyshev, Hamming, etc.), or another measure among the interaction dataset for each client device within the subset of client devices. While applying the clustering algorithm, the data points from the interaction dataset may be stored or maintained in a data structure (e.g., array, list, linked list, heap, table, tree, matrix, etc.) arranged or indexed by a client device identifier corresponding to each of the client devices. In some implementations, the computing device can calculate the one or more similarity measures among the one or more subsets of client devices based on the number of interactions with one content element prior or subsequent to interacting with another content element, the time durations of the infractions for each content element, and the client device attribute for each client device. In some implementations, the computing device can calculate any number of similarity measures for any number of subsets of client devices from the plurality of client devices based on the interaction dataset. In some implementations, the computing device can calculate the one or more similarity measures among the one or mote subsets of client devices further based on the client device attributes for each client device. In some implementations, the computing device can, using the clustering algorithm, identify one or more sub-subsets of client devices from at least one subset of client devices from the one or more client devices based on the corresponding interaction dataset.

The computing device can determine whether the clustering algorithm has converged (ACT 421). If the clustering algorithm has not converged, the computing device can repeat ACT 418. In some implementations, using the counter, the computing device can iteratively calculate the one or more similarity measures based on the interaction dataset. In some implementations, using the comparator, the computing device can compare a difference of the respective similarity measures between each iteration to a threshold measure or a convergence threshold. For example, the computing device can apply a K-nearest neighbors (k-NN) algorithm using the number of interactions and time duration of interactions per content element for each of the client devices. The computing device can initially set each client device to a data point in anti-dimensional space using the number of interactions among the content elements, time duration of interactions per content element, client device attributes, and content element, or any combination thereof, as axes. The computing device can then set the data points for each client device among k segments. After segmenting the data points, the computing device can identify the centroid for each segment and calculate the distance between the centroid and the data points assigned to the segment. For each segment, the computing device can also calculate the average point among the data point assigned to the segment and compare the average point to the centroid. If the distance between the average point and the centroid is above a convergence threshold, the computing device can set the average point as the centroid and reassign data points corresponding to a client device to a new segment. In this example, this process may be repeated until the distance between the average point and the centroid or the difference between the previously calculated centroid and the currently calculated centroid is below a convergence threshold.

In some implementations, using the counter, the computing device can determine whether the calculation of the one or more similarity measures is the first time or iteration. In some implementations, the computing device can, using the clustering algorithm, recalculate the one or more similarity measures, responsive to determining that the calculation of the one or more similarity measures is the first time or iteration. In some implementations, the computing device can compare a number of times of the calculation of the one or more similarity measures to a threshold number of iterations. The threshold number of iterations may be pre-defined or pre-set based on the number of subsets of client devices. In some implementations, the computing device can, using the clustering algorithm, recalculate the one or more similarity measures, responsive to determining that the number of times of the calculation of the one or more similarity measures is less than the threshold number of iterations. In some implementations, the computing device can terminate the clustering algorithm or end further calculations of the one or more similarity measures, responsive to determining that the number of times of the calculations is greater than or equal to the threshold number of iterations.

If the clustering algorithm has converged, the computing device can identify a subset of client devices based on the similarity measure (ACT 424). The computing device can identify or select, using the clustering algorithm, at least one subset of client devices from the plurality of client devices based on the respective similarity measure among the subset of client devices. In some implementations, the computing device can identify a number of client devices assigned to the one or more subsets of client devices. In some implementations, using the comparator, the computing device can compare the number of client devices in each subset of client devices to a threshold number. In some implementations, the computing device can select the at least one subset of client devices, responsive to determining that the number of client devices for the respective subset of client devices is greater than or equal to the threshold number. In some implementations, the computing device can, using the clustering algorithm, recalculate the one or more similarity measures for another subset of client devices from the plurality of client devices, responsive to determining that the number of client devices for the respective subset of client devices is less than the threshold number.

In some implementations, the computing device can identify or determine an associated number of content elements corresponding to the at least one subset of client devices from the plurality of client devices based on the similarity measure among the subset of client devices. In some implementations, the computing device can compare the associated number of content elements to a predefined threshold number. In some implementations, the computing device can select the at least one subset of client devices, responsive to determining that the number of content elements is greater than or equal to the predefined threshold number. In some implementations, the computing device can select another subset of client devices, responsive to determining that the associated number of content elements is less than the predefined threshold number. In some implementations, the computing device, using the clustering algorithm, can recalculate the one or more similarity measures for another subset of client devices from the plurality of client devices, responsive to determining that the associated number of content elements is less than the predefined threshold number.

The computing device can identify interaction statistics in the interaction dataset for the identified subset of client devices (ACT 427). In some implementations, the computing device can identify the one more interaction statistics corresponding to the at least one selected subset of client devices. In some implementations, the computing device can search the interaction statistics storage 234 to find or identify the number of interactions by each of the client devices of the at least one selected subset of client devices with one content element prior to interacting with another content element. In some implementations, the computing device can search the interaction statistics storage 234 to find or identify the lime durations by each of the client devices of the at least one selected subset of client devices with each associated content element. In some implementations, the computing device can search the interaction statistics storage 234 to find or identify the client device attributes for each of the client devices of the at least one selected subset of client devices. In some implementations, the computing device can search or identify the content element identifiers corresponding to the content elements associated with the subset of client devices.

The computing device can identify the content element for the interaction statistics (ACT 430). The computing device can determine or identify the one or mote content elements for the corresponding one or more interaction statistics based on the corresponding content element identifier. In some implementations, the computing device can search for the one or more content elements for the corresponding one or more interaction statistics based on the corresponding content element identifier for example, the computing device can access a data structure storing the interaction statistics and the content element identifiers. In this example, using the content element identifier from the data structure, the computing device can search to find the corresponding content element by iterating through the one or more content elements using the counter. In some implementations, the computing device can identify the one or more interaction statistics for each of the one or more content elements based on the corresponding content element identifier. In some implementations, the computing device can identify the one or more content elements corresponding to the selected subset of client devices.

The computing device can determine or identify which of the one or more content elements are actionable. In some implementations, the computing device can determine or identify which of the one or more content elements are actionable among the one or more content elements associated with the subset of client devices. Actionable content elements can include those content elements, event listeners of which are enabled. The computing device can determine or identify which of the one or more content elements are non-actionable. In some implementations, the computing device can determine or identify which of the one or more content elements are non-actionable among the one or more content elements associated with the subset of client devices. Non-actionable content elements can include those content elements, the event listeners of which are disabled. In some implementations, non-actionable content elements can also include those content elements that do not specify any further instructions or executable logic upon triggering of event listeners for the respective content element. In some implementations, the computing device can determine which of the one or more content elements are non-actionable based on a corresponding element type of the content element.

The computing device can calculate the time metric for the i-th content element (ACT 433). In some implementations, the computing device can an average time duration for each content element based on the time durations of interactions by the one or more client devices for the respective content element. In some implementations, the computing device can calculate a time duration sum for each content element over the time duration of interaction for each client device in the at least one subset of client devices for the respective content element. In some implementations, the computing device can calculate or identify a number of the one or more client devices. In some implementations, the computing device can calculate the average time duration for each content element based on the time duration sum for the respective content element and the number of client devices in the at least one subset of client devices. In some implementations, the computing device can adjust, modify, or otherwise weigh the conditional probability for each content element based on the average time duration for the respective content element. For example, the computing device can multiply the conditional probability by the average rime duration to generate the interaction sequence metrics.

In some implementations, the computing device can calculate which range of the one or more time duration ranges the time durations of interacting with the respective content element is within. In some implementations, the computing device can calculate which range of the one or more time duration ranges the calculated average time duration of interactions with the respective content element is within. The one or more time duration ranges may be quantiles (e.g., tertiles, quartiles, deciles, etc.) or uneven predefined ranges. In sonic implementations, the one or more lime duration ranges may be defined using variance measures (e.g., 1-sigma, 2-sigma, etc.) of the time durations of interacting with the respective content element. In some implementations, the computing device can assign the time duration range for the respective content element by dividing the calculated average time duration for the respective content element by a predefined quantile.

The computing device can calculate the conditional probabilities for interacting with the i-th content element prior or subsequent to interacting with the other N-I content elements (ACT 436). In some implementations, the computing device can calculate a total number of interactions by the at least one selected subset of client devices over the content elements of the information resource. In some implementations, the total number of interactions may be a sum of the number of interactions for each content element or the selected content elements associated with the at least one selected subset of client devices. In some implementations, the total number of interactions may be a sum of the number of interactions over a subset of the content elements. In some implementations, the computing device can calculate a conditional probability for each content element based on the number of interactions for the respective content element and the total number of interactions over all of the content elements. The conditional probability for a given content element may be, for example, of the following mathematical form $p(i_t|\bar{i}_{t-1})$, where $i_t$ is the interaction for i-th content element at the i-th sequence and $\bar{i}_{t-1}$ is the interaction for content elements excluding the i-th content element at the t−1-th sequence. In some implementations, the computing device can generate or otherwise calculate a conditional probability matrix for each content element based on the number of interactions for the respective content element and the total number of interactions overall of the content elements. In some implementations, the computing device can generate the conditional probability matrix using the conditional probability for each content element. The conditional probability matrix may be, for example, n-dimensional. Using the conditional probability or the conditional probability matrix, the computing device can calculate the interaction sequence metric for the respective content element.

The computing device can calculate the interaction sequence metric based on the interaction time duration and the calculated conditional probabilities for the i-th content element (ACT 439). The computing device can calculate one or more interaction sequence metrics for interactions by the at least one selected subset of client devices with each content element prior or subsequent to interacting with other content elements based on the interaction statistics. The one or more interaction sequence metrics may indicate a likelihood or frequency of the client devices of the at least one selected subset of client devices with one content element prior or subsequent to interacting with another content element. In some implementations, the computing device can calculate the one or more interaction sequence metrics for the interactions by the at least one selected subset of client devices with one of the identified content elements prior or subsequent to interacting with another content element of the identified content elements. In some implementations, the computing device can calculate the one or more interaction sequence metrics, responsive to determining that the number of client devices for the respective subset of client devices is greater than or equal to the threshold number. The interaction statistics may be stored or maintained in a data structure (e.g., array, list, linked list, heap, table, tree, matrix, etc.) arranged, indexed, or otherwise identified by the content element identifier. In some implementations, the computing device can calculate the one or more interaction sequence metrics based on the number of interactions and the time durations for the respective content element. In some implementations, the computing device can calculate the interaction sequence metric at the predefined lime interval. In some implementations, the computing device can calculate the interaction sequence metric, responsive to receiving the updated one or more interaction statistics. In some implementations, the computing device can calculate the one or more interaction sequence metrics based on the interaction statistics for each client device segment.

In some implementations, the computing device can compare the one or more interaction sequence metrics among different subsets of client devices identified form the clustering algorithm. In some implementations, the computing device can calculate the one or more interaction sequence metrics for interactions by another subset of client devices with each content element prior or subsequent to interacting with other content elements based on the interaction statistics. In some implementations, the computing device can calculate the one or more interaction sequence metrics for the interactions by the other subset of client devices with one of the identified content elements prior or subsequent to interacting with another content element of the identified content elements. In some implementations, the computing device can determine calculate an interaction sequence difference measure for a respective content element based on the respective interaction sequence metrics of one subset of client devices for the respective content element and the respective interaction sequence metrics for the other subset of client devices for the respective content element. For example, the computing device can subtract or divide the two interaction sequence metrics for two respective subsets of client devices for interacting with one content element prior or subsequent to interacting with another content element to determine the respective interaction sequence difference measure.

In some implementations, the computing device can adjust, modify, or otherwise weigh the conditional probability for each content element based on the average time duration for the respective content element. For example, the computing device can multiply the conditional probability by the average time duration to generate the interaction sequence metrics.

In some implementations, using the comparator, the computing device can determine which range of the one or more interaction sequence metric ranges the calculated interaction sequence metric is within. The one or more interaction sequence metric ranges can be quantiles (e.g., tertiles, quartiles, deciles, etc.) or uneven predefined ranges. In some implementations, the one or more interaction sequence metric ranges may be defined using variance measures (e.g., 1-sigma, 2-sigma, etc.) of the one or more calculated interaction sequence metrics. For example, the computing device can calculate a variance of the calculated interaction sequence metrics. Using the calculated variance, the computing device can compute the standard deviation and set multiples of the standard deviations as the one or more interaction sequence metric ranges. In some implementations, the computing device can determine which range of the one or more interaction sequence metric ranges per client device segment.

The computing device can determine whether the i-th content element is the last content element on the information resource (ACT 442). In some implementations, the computing device can traverse the content elements of the information resource to calculate the interaction sequence metrics for each content element. In some implementations, upon calculating the interaction sequence metric for the respective content element, using a counter, the computing device can determine whether there are more content elements remaining on the information resource. If the i-th content element is not the last content element on the information resource, the computing device can identify the next content element (ACT 445) and subsequent repeat ACTS 430-4442.

If the i-th content element is the last content element on the information resource, the computing device can select the top M content elements with the highest interaction sequence metrics. The computing device can select a subset of the one or more content elements of the information resource based on the calculated interaction sequence metrics for the content elements. In some implementations, the computing device can identify the subset of the one or more content elements corresponding to the highest respective subset of interaction sequence metrics using the comparator. In some implementations, using the comparator, the computing device can compare the interaction sequence metrics for each content element to identify the subset of content elements corresponding to the highest respective subset of interaction sequence metrics. For example, the computing device can identify n content elements with the top n interaction sequence metrics.

In some implementations, using the comparator, the computing device can compare the interaction sequence metric of each content elements among another to determine whether that the interaction sequence metric differs by at least a predetermined margin. In some implementations, the computing device can select the subset of the one or more content elements, responsive to determining that the respective interaction sequence metrics for the subset of the content elements is each greater than other interaction subsequence metrics of other content elements by the predetermined margin.

In some implementations, using the comparator, the computing device can determine which range of the one or more interaction sequence metric ranges the calculated interaction sequence metric is within. The one or more interaction sequence metric ranges can be quantiles (e.g., tertiles, quantiles, deciles, etc.) or uneven predefined ranges. In some implementations, the one or more interaction sequence metric ranges may be defined using variance measures (e.g., 1-sigma, 2-sigma, etc.) of the one or more calculated interaction sequence metrics. For example, the computing device can calculate a variance of the calculated interaction sequence metrics. Using the calculated variance, the computing device can compute the standard deviation and set multiples of the standard deviations as the one or more interaction sequence metric ranges. In some implementations, the computing device can determine which range of the one or more interaction sequence metric ranges per client device segment.

In some implementations, the computing device can calculate which range of the one or more time duration ranges the time durations of interacting with the respective content element is within. In some implementations, the computing device can calculate which range of the one or more time duration ranges the calculated average lime duration of interactions with the respective content element is within. In some implementations, the computing device can calculate one or more numbers of time intervals between the interactions by each of the subset of client devices with one content element prior or subsequent to interacting with another content element based on the plurality of time durations corresponding to the subset of client devices. The one or more time duration ranges or intervals may be quantiles (e.g., tertiles, quartiles, deciles, etc.) or uneven predefined ranges. In some implementations, the one or more time duration ranges may be defined using variance measures (e.g., 1-sigma, 2-sigma, etc.) of the time durations of interacting with the respective content element. In some implementations, the computing device can assign the time duration range for the respective content element by dividing the calculated average time duration for the respective content element by a predefined quantile.

If the i-th content element is the last content element on the information resource, the computing device can generate nodes corresponding to selected content elements for a graph element (ACT 448). In some implementations, the graph element may be a graphical user interface for the application or another application running on the computing device (e.g., computing device). In some implementations, the graph element may be another information resource including DOM tree elements to display a graph representing the calculated interaction sequence metrics. In some implementations, the graph element may be an overlay content element inserted in the information resource, computing device information resource. The graph may include a set of nodes, a set of paths, and a set of loops. The graph may be, for example, acyclic or cyclic, directed or undirected, mixed, or be of any combination and form. The graph may be a data structure (e.g., array, list, linked list, heap, table, tree, matrix, etc.) including the set of nodes, the set of paths, and the set of loops arranged or indexed by the respective content element identifier. Each node of the graph may correspond to a content element. In some implementations, for each node corresponding to the respective content element, the computing device can modify the canvas element for the graph element to include a mark. The mark can be of any shape with any set visual property. For example, the computing device can invoke the function "arc( )" to draw a circle or "fillRect( )" to draw a rectangle onto the canvas element.

The computing device can generate paths corresponding to the interaction sequence metrics among the content elements for the graph element (ACT 451). Each path of the graph may be connected from one node to another node, and may indicate the one or more calculated interaction sequence metrics for the interactions by each of the client devices of the at least one selected subset of client devices with one content element prior or subsequent to another content element. In some implementations, for each path corresponding to the one or more calculated interaction sequence metrics for the respective content element, the computing device can modify the canvas element to include a line from one node to another. In some implementations, for each loop corresponding to the time durations for interacting or the number of interactions with the respective content element, the computing device can modify the canvas element to include a line from one node to itself. For example, in drawing the line onto the canvas for the path or the loops, the computing device can invoke the "arcTo( )," "lineTo( )," "quadraticCurveTo( )," or "bezierCurveTo( )" function to draw a line from one node to another or itself.

The computing device can generate loops for the interaction sequence metrics for the graph element (ACT 454). Each loop of the graph may be a self-referential edge connected from one node to itself, and may correspond to the time durations of interacting with the respective content element corresponding to the node. In some implementations, the computing device can generate a set of loops for each node based on the time duration of interactions with the respective content element. In some implementations, the computing device can generate the set of loops based on the time duration range or interval for the time durations of interactions by each of the client devices of the at least one selected subset of client devices with the respective content element. For example, the one or more time duration ranges may be n buckets. In this example, the computing device can identify the number of loops to generate based on the bucket the time duration for interactions with the respective content element is within. In some implementations, the computing device can set a start point and end point of each loop for the respective content element based on the position property of the respective content element. In some implementations, the computing device can set the start point of a loop based on the end point of another loop on the node.

The computing device can determine which range the interaction sequence metric is within. The computing device can set the respective node or the respective edge to a visual style based on the determined range. In some implementations, the computing device can set a visual property of each path of the graph of the graph element based on the respective one or more calculated interaction sequence metrics. The visual property may include, for example, color, width, dashes, size, among others. In some implementations, the computing device can set the visual property of each path of the graph element based on the identifier respective interaction sequence metric range. In some implementations, using the comparator, the computing device can compare the one or mote interaction sequence metrics among the one or more content elements to one another interaction sequence metric. In some implementations, the computing device can determine that the one or more interaction sequence metrics is greater than other interaction sequence metrics by at least a predetermined margin. In some implementations, using the comparator, the computing device can set the visual property of the respective path different from the visual property of the other respective path, responsive to determining that the respective interaction sequence metric is greater than the other respective interaction sequence metric by at least the predetermined margin.

In some implementations, the computing device can generate the graph element at a predefined time interval. For example, the computing device may receive the one or more interaction statistics periodically. Each the one or more interaction statistics is received, the computing device can calculate the interaction sequence metrics and the computing device can generate the graph element. In some implementations, the computing device can generate or create the graph for insertion as the graph element into the information resource. In some implementations, the computing device can instantiate a canvas element as the graph element on the DOM tree element generated for the information resource.

In some implementations, the computing device can generate the graph for multiple subsets of client devices. In some implementations, the graph for the multiple subset of client devices may be to compare the calculated interaction sequence metrics among the multiple subsets of client devices. In some implementations, the computing device can set the visual property of each path, each node, or each loop of the graph based on the calculated interaction sequence difference measures among the multiple subsets of client devices. For example, an interaction sequence metric for one subset of client devices may be higher than the respective interaction sequence metric for another subset of client devices. This may indicate that one of the content elements is more frequented by one subset of client devices than the other subset of client devices. In this example, the computing device may set the visual properties of the paths and nodes to a specified visual property (e.g., different color, different thickness, different fill pattern, etc.) than the default to indicate the difference in the interaction sequence metrics between the two subsets of client devices.

In some implementations, the computing device can insert descriptors into the graph element. Example of descriptors may include text, hyperlinks, and images, among others. Each descriptor may correspond to a content element and be positioned over or adjacent to the node corresponding to the respective content element on the graph. The descriptor can include a content element identifier, time durations, interaction statistics, time range, or the interaction sequence metric, among others. In some implementations, the computing device can insert a text element into the graph. The text element may correspond to a content element and be positioned over one of the nodes corresponding to the content element. In some implementations, the text element can include the content element identifier corresponding to the content element. In some implementations, the computing device can include a hyperlink in the text element. The hyperlink may include a landing information resource included in the respective content element.

The computing device can display the graph on the graphical user interface (ACT 457). The computing device can render and display the information resource including the one or more content elements and the graph element. In some implementations, the computing device can display the graph element as the overlay interface element on the information resource. In some implementations, the computing device can display the graph element as the transparent overlay over the one or more content elements of the information resource. In some implementations, the computing device can display the marks over the one or more content elements on the information resource. In some implementations, the computing device can dynamically update the rendering and displaying of the graph element. For example, if the computing device reprocesses the updated interaction statistics received from the data processing system, the computing device can re-render and display the updated graph element.

In some implementations, the computing device can insert the graph element into the information resource over the one or more content elements. Visually, the graph element may be, for example, transparent so that the set of nodes, the set of paths, and the set of loops appear visible on a layer (e.g., z-level) above with the one or more content elements on the information resource. In some implementations, the computing device can identify the content element corresponding to the respective node based on the respective content element identifier for the content element. In some implementations, the computing device can identify which of the one or more content elements are actionable. In some implementations, the computing device can identify which of the one or more content elements are non-actionable. In some implementations, the computing device can insert the graph element into the information resource over the one or more content elements identified as actionable.

In some implementations, the computing device can identify a position property of the content element. The position property can include the x-y coordinates on the information resource and dimensions of the respective content element. In some implementations, the computing device can set a position property of the nodes of the graph to the position property of the respective content element. In some implementations, the computing device can set a position property of each node to overlap or be adjacent to the respective content element. In some implementations, the computing device can set an end point of the path for the one or more calculated interaction sequence metrics for the respective content element to the position property of the other content elements. In some implementations, the computing device can include or insert a marker at the end point of the path to indicate direction of the one or more interaction sequence metrics. For example, the graph generator module may modify the canvas element for the graph element to insert an arrow head at the end point.

In some implementations, the computing device can insert the graph element as an overlay interface element on the information resource. The overlay interface element can include the graph including the set of nodes, the set of paths, and the set of loops. In some implementations, the computing device can generate the overlay interface element based on position properties of each content element of the information resource. In some implementations, the computing device can identify a size of the information resource or a viewport of the application. In some implementations, the computing device can set the overlay interface element to a size smaller than the size of the information resource. In some implementations, the computing device can set the overlay interface element to the size smaller than the viewport of the application on a display of the content administrator device.

In some implementations, the computing device can calculate or identify a coordinate for each node proportional on the overlay interface element as to the position property of the respective content element on the information resource. In some implementations, the computing device can calculate an offset coordinate value based on a position property of the overlay interface element on the information resource. In some implementations, the computing device can adjust or modify the coordinate for each node by the calculated offset. In some implementations, the computing device can set the start point and the end point of each path and each loop based the size of the overlay interface element and the adjusted coordinate for each node. In some implementations, the computing device can identify the adjusted coordinate for each node. In some implementations, the computing device can set the start point of a path to the coordinate of the corresponding node for the interaction sequence metric. In some implementations, the computing device can set the end point of the path to a coordinate of another corresponding for the interaction sequence metric. In some implementations, the computing device can set the start point and the send point of a loop based on the coordinate of the corresponding node for the interaction sequence metric for the respective content element.

The computing device can insert the graph element into an application, the information resource including the content elements, or another information resource. In some implementations, the computing device can instantiate any number of DOM tree elements or invoke any number of functions to generate the graph or the graph element. The computing device can generate a graph element using the one or more calculated interaction sequence metrics. The graph element may be a DOM tree element (e.g., canvas) instantiated by the computing device and appended to the content elements of the information resource. The graph element can include a graph. In some implementations, the computing device can generate a plurality of graph elements, each including a set of nodes, a set of paths, and a set of loops, using the interaction sequence metrics per client device subset.

In some implementations, the computing device can instantiate a graphical user interface to insert the graph element. In some implementations, the computing device can instantiate another information resource different from the information resource to insert the graph element. For example, the computing device can automatically generate HyperText Markup Language (HTML) code including computer-executable instructions to render and display the graph. In this example, the computing device can invoke the function "window.open( )" including the address of the HTML code to instantiate and open another browser window in the application.

The data processing system can determine whether the time elapsed since the request for interaction statistics is greater than or equal to a predefined time threshold (ACT 460). The data processing system can maintain a timer to determine whether time elapsed since receiving the request for interaction statistics is greater than or equal to a predefined time threshold. In some implementations, the data processing system can determine whether the time elapsed since transmitting the one or more interaction statistics is greater than or equal to the predefined time threshold. The data processing system can transmit the one or more interaction statistics to the content provider devices, the content publisher devices, the client devices, and the computing device associated with the request for interaction statistics, responsive to determining that the time elapsed is greater than or equal to the predefined time threshold. In some implementations, the data processing system can determine whether the time elapsed since transmitting the one or more interaction statistics is greater than or equal to the predefined time threshold.

If the time has elapsed since the request for interaction statistics is less than the predefined time threshold, the data processing system can monitor for changes in interaction statistics (ACT 463). The data processing system can maintain a comparator to determine whether the one or more interaction statistics have changed by at least a predefined statistic threshold. The comparator can include an application, service, server, daemon, routine, or other executable logic for comparing the one or more interaction statistics. In some implementations, the data processing system can determine whether the one or more interaction statistics have changed by at least a predefined statistic threshold, responsive to determining that the time elapsed since the request for interaction statistics or since transmitting the one or more interaction statistics is less than the predefined time threshold. In some implementations, the data processing system can retrieve the entries of the interaction log of the database for the information resource or the content element identified in the request for interaction statistics. In some implementations, the interaction statistics module can determine whether the one or more interaction statistics have changed by at least a predefined statistic threshold per client device segment.

The data processing system can determine whether the change in interaction statistics is greater than or equal to a predefined statistic threshold (ACT 446). If the change in interaction statistics is less than the predefined statistic threshold, the data processing system can return to ACT 460. In some implementations, the data processing system can compare a length of the currently retrieved entries to a length of the previously retrieved entries. If the length of the currently retrieved entries is greater than the length of the previously retrieved entries by at least a predefined statistic threshold length, the data processing system can recalculate the one or more interaction statistics based on the currently retrieved entries. In some implementations, the data processing system can transmit the one or more interaction statistics to the computing device associated with the request for interaction statistics. In some implementations, the data processing system can compare the length of the currently retrieved entries to the length of the previously retrieved entries per client device segment.

In some implementations, the data processing system can calculate the one or more interaction statistics from the currently retrieved entries of the interaction log. In some implementations, the data processing system can compare the one or more interaction statistics calculated from the currently retrieved entries of the interaction log to the one or more interaction statistics calculated from the previously retrieved entries of the interaction log by at least a predefined statistic threshold. In some implementations, the predefined statistic threshold may differ from interaction type. In some implementations, if any of the one or more interaction statistics calculated from the currently retrieved entries of the interaction log is different from the corresponding one or more interaction statistics calculated from the previously retrieved entries of the interaction log by the predefined statistic threshold, the data processing system can transmit the one or more interaction statistics calculated from the currently retrieved entries to the content provider devices, the content publisher devices, the client devices, and the computing device associated with the request for interaction statistics. In some implementations, the data processing system can calculate the one or more interaction statistics from the currently retrieved entries of the interaction log per client device segment.

In some implementations, the data processing system can determine the number of the one or more interaction statistics calculated from the currently retrieved entries different from the one or more interaction statistics calculated from the previously retrieved entries by the predefined statistic threshold. If the number of the one or more interaction statistics calculated from the currently retrieved entries different from the one or more interaction statistics calculated from the previously retrieved entries by the predefined statistic threshold, the interaction statistic module 130 can transmit the one or mote interaction statistics calculated from the currently retrieved entries to the content provider devices, the content publisher devices, the client devices, and the computing device associated with the request for interaction statistics. In some implementations, the data processing system can determine the number of the one or more interaction statistics calculated from the currently retrieved entries different from the one or more interaction statistics calculated from the previously retrieved entries from the interaction log by the predefined statistic threshold per client device segment.

If the lime has elapsed since the request for interaction statistics is greater than the predefined time threshold or the change in interaction statistics is greater than the predefined statistic threshold, the data processing system can transmit updated interaction statistics (ACT 469). The computing device can receive the updated interaction statistics (ACT 471). The computing device can determine whether the script is executing (ACT 474). If the script is not executing, the computing device can terminate (ACT 477). If the script is still executing, the computing device can return to ACT 418.

Figure 5:
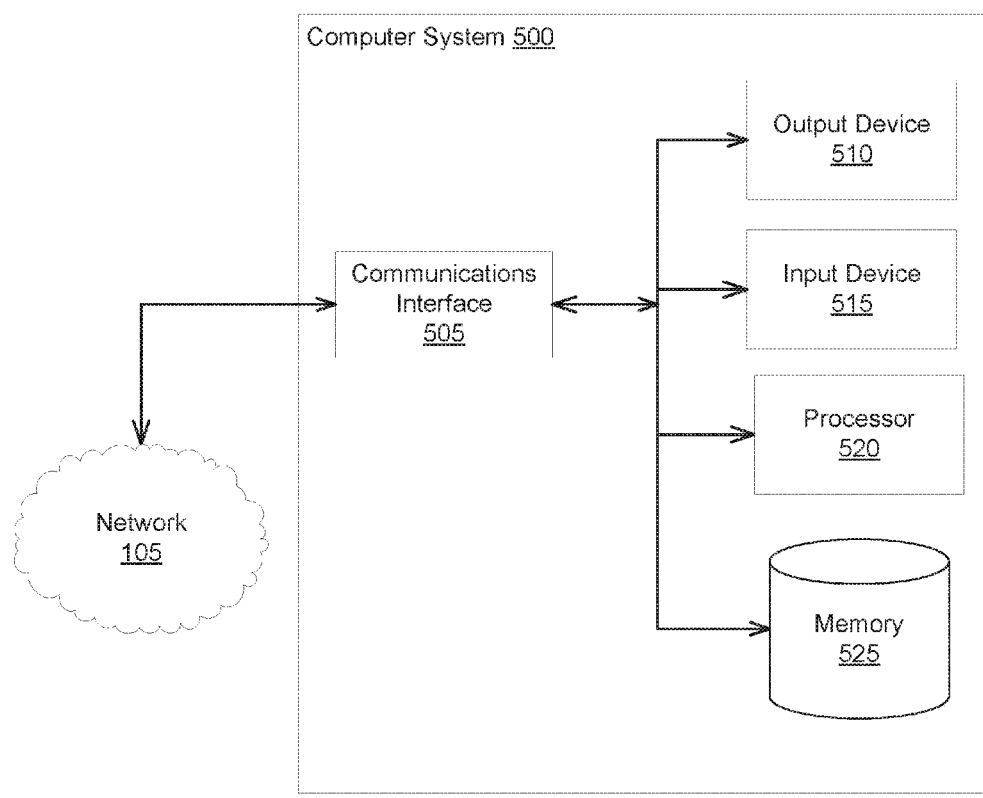
FIG. 5 is a block diagram illustrating a general architecture for a computer system that may be employed to implement elements of the systems and methods described and illustrated herein, according to an illustrative implementation.

FIG. 5 shows the general architecture of an illustrative computer system 500 that may be employed to implement any of the computer systems discussed herein including the system 110 and its components such as the content delivery module 130, interaction recorder module 132, script provider module 136, and interaction statistics module 134 and the content administrator device 138 and its components such as the processor 202, I/O interface 206, network interface 206, memory 208, application 210, interaction statistics visualization script 220, metric calculator module 224, metric calculator module 224, graph generator module 226, a visualization interface element 226, counter 228, comparator 230, timer 230, and rendering engine 214) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content delivery module 130, interaction recorder module 132, script provider module 136, or the interaction statistics module 134. The processors 520 can be also included in the content administrator device 145 or the components of content administrator device 145 such as the metric calculator module 224, graph generator module 226, counter 228, comparator 230, timer 230, application 210, resource request module 212, and rendering module 214, among others.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interfaces) or input device(s) (if present). Referring again to the system 110 of FIG. 1, the data processing system 110 can include the memory 525 to store information related to the interaction log 140, and the interaction statistics of the content elements on the information resource 216. The memory 525 can include the database 138. In referring to FIG. 2, the content provider administrator device 145 can be used to store information resource 216, content elements, instructions for the various submodules of the interaction statistics visualization script 220, interaction statistics storage 230, interaction statistics 232, and instructions for the application 210, among others. The processors) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110. The communications interface 505 may be used as the network interface 204 of the content administrator device 145.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein. The input devices 510 and the output devices 515 may be used as the I/O interface 206 of the content administrator device 145.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with mote traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific in(integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content delivery module 130, interaction recorder module 132, script provider module 136, and interaction statistics module 134 can include or share one or more data processing apparatuses, computing devices, or processors. The interaction statistics visualization script 220, metric calculator module 224, graph generator module 226, counter 228, comparator 230, timer, 228, application 210, resource request module 212, and rendering engine 214 can include or share one or more computing devices or processors (e.g., processor 202) of the content administrator device 145 (or client device 125A-N).

A computer program also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific in(integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks, and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can include any form of sensory feedback, e.g., usual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be in(integrated together in a single software product or packaged into multiple software products. For example, the content delivery module 130, interaction recorder module 132, script provider module 136, and the interaction statistics module 134 can be pan of the data processing system 110, a single module, a logic device having one or more processing modules, one or more servers, or pan of a search engine. In addition, the application 205, interaction statistics visualization script 220, resource request module 212, clustering module 222, metric calculator module 224, graph generator module 226, counter 228, comparator 230, timer 232, and rendering engine 214 can be pan of a computing device (e.g., content administrator device 145), a single module, of a log device having one or mote processing modules.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in pan on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and response to determining a change in the data, identifying one or more content elements to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of rendering Internet interaction statistical data on graphical user interfaces, comprising:

calculating, by a computing device having one or more processors, interaction sequence metrics for interactions by subsets of client devices with a first content element and a second content element on an information resource;

calculating, by the computing device, interaction sequence difference measures between the interaction sequence metrics among the subsets of client devices;

generating, by the computing device, using the interaction sequence metrics and the difference measures, a graph element including:
  a first node corresponding to the first content element of the information resource;
  a second node corresponding to the second content element of the information resource;
  a first directed path from the first node to the second node indicating a first interaction sequence metric for interactions by a first subset of client devices with the first content element prior to interacting with the second content element;
  a second directed path from the second node to the first node indicating a second interaction sequence metric for the interactions by the first subset of client devices with the second content element prior to interacting with the first content element;
  a third directed path indicating a first interaction sequence difference measure corresponding to a difference between the first interaction sequence metric and a third interaction sequence metric for interactions by a second subset of client device with the first content element prior to interacting with the second content element; and
  a fourth directed path indicating a second interaction sequence difference measure corresponding to a difference between the second interaction sequence metric and a fourth interaction sequence metric for interactions by the second subset of client device with the second content element prior to interacting with the first content element; and displaying, by the computing device, the graph element in a graphical user interface overlaid on the information resource including the first content element and the second content element.

2. The method of claim 1, further comprising receiving via a network interface from a log database, an interaction dataset for the information resource including the first content element and the second content element, the interaction dataset including:
  a first number of interactions by a plurality of client devices with the first content element prior to interacting with the second content element, the plurality of client devices including the first subset of client devices and the second subset of client device,
  a second number of interactions by the plurality of client devices with the second content element prior to interacting with the first content element,
  a first time duration for interacting with the first content element by each of the plurality of client devices, and
  a second time duration for interacting with the second content element by each of the plurality of client devices.

3. The method of claim 1, further comprising:
calculating, by the computing device, using a clustering algorithm, a first similarity measure among the first subset of client devices from a plurality of client devices based on a first number of interactions with the first content element, a second number of interactions with the second content element, a first time duration for interacting with the first content element, and a second time duration for interacting with the second content element, the plurality of client devices including the first subset of client devices and the second subset of client devices;

calculating, by the computing device, using the clustering algorithm, a second similarity measure among a second subset of client devices from the plurality of client devices based on the first number of interactions, the second number of interactions, the first time duration, and the second time duration;

identifying, by the computing device, using the clustering algorithm, the first subset of client devices from the plurality of client devices based on the first similarity measure; and identifying, by the computing device, using the clustering algorithm, the second subset of client devices from the plurality of client devices based on the second similarity measure.

4. The method of claim 1, further comprising:

calculating, by the computing device, the first interaction sequence metric for interactions by the first subset of client devices with the first content element prior to interacting with the second content element on the information resource based on a corresponding first number of interactions and a corresponding first time interaction duration for the first subset of client devices;

calculating, by the computing device, the second interaction sequence metric for interactions by the first subset of client devices with the second content element prior to interacting with the first content element on the information resource based on a corresponding second number of interactions and a corresponding second time interaction duration for the first subset of client devices;

calculating, by the computing device, the third interaction sequence metric for interactions by the second subset of client devices with the first content element prior to interacting with the second content element on the information resource based on the corresponding first number of interactions and the corresponding first time interaction duration for the second subset of client devices;

calculating, by the computing device, the fourth interaction sequence metric for interactions by the second subset of client devices with the second content element prior to interacting with the first content element on the information resource based on the corresponding second number of interactions and the corresponding second time interaction duration for the second subset of client devices;

determining, by the computing device, the first interaction sequence difference measure based on the first interaction sequence metric and the third interaction sequence metric; and determining, by the computing device, the second interaction sequence difference measure based on the second interaction sequence metric and the fourth interaction sequence metric.

5. The method of claim 1, further comprising:

calculating, by the computing device, a first number of time intervals between the interactions by the first subset of client devices with the first content element prior to interacting with the second content element based on a corresponding first time duration for the first subset of client devices;

calculating, by the computing device, a second number of time intervals between the interactions by the first subset of client devices with the second content element prior to interacting with the first content element based on a corresponding second time duration for the first subset of client devices;

wherein generating the graph element further comprises generating the graph element including:
- a first directed loop from and to the first content element indicating the first number of time intervals between the interactions by the first subset of client devices with the first content element prior to interacting with the second content element; and
- a second directed loop from and to the second content element indicating the second number of time intervals between the interactions by the first subset of client devices with the second content element prior to interacting with the first content element.

6. The method of claim 1, wherein generating the graph element further comprises:

setting the first node to a first position in the graph element based on a position of the first content element within the information resource; and setting the second node to a second position in the graph element based on a position of the second content element within the information resource.

7. The method of claim 1, wherein displaying the graph element further comprises displaying the graph element as an overlay interface element on the information resource with the first content element and the second content element.

8. The method of claim 1, further comprising:

comparing, by the computing device, a first number of interactions and a first time interaction duration on the first content element with a second number of interactions and a second time interaction duration on the second content element; and setting, by the computing device, the first node to a first visual property; and setting, by the computing device, the second node to a second visual property different from the first visual property, responsive to determining that the first number of interactions and the first time interaction duration is different from the second number of interactions and the second time interaction duration.

9. The method of claim 1, further comprising:

comparing, by the computing device, the first interaction sequence metric to the second interaction sequence metric; and setting, by the computing device, the first directed path to a first visual property; and setting, by the computing device, the second directed path to a second visual property different from the first visual property, responsive to determining that the first interaction sequence metric is different from the second interaction sequence metric by at least a predetermined margin.

10. The method of claim 1, wherein generating the graph element further comprises:

inserting a first descriptor element positioned on the first node corresponding to the first content element, the first descriptor element including a first identifier of the first content element; and inserting a second descriptor element positioned on the second node corresponding to the second content element, the second descriptor element including a second identifier of the second content element.

11. A system for rendering Internet interaction statistical data on graphical user interfaces, comprising:
a computing device having one or more processors and operably coupled to memory, configured to:
calculate interaction sequence metrics for interactions by subsets of client devices with a first content element and a second content element on an information resource;
calculate interaction sequence difference measures between the interaction sequence metrics among the subsets of client devices;
generate, using the interaction sequence metrics and the difference measures, a graph element including:
a first node corresponding to the first content element of the information resource;
a second node corresponding to the second content element of the information resource;
a first directed path from the first node to the second node indicating a first interaction sequence metric for interactions by a first subset of client devices with the first content element prior to interacting with the second content element;
a second directed path from the second node to the first node indicating a second interaction sequence metric for the interactions by the first subset of client devices with the second content element prior to interacting with the first content element;
a third directed path indicating a first interaction sequence difference measure corresponding to a difference between the first interaction sequence metric and a third interaction sequence metric for interactions by a second subset of client device with the first content element prior to interacting with the second content element; and
a fourth directed path indicating a second interaction sequence difference measure corresponding to a difference between the second interaction sequence metric and a fourth interaction sequence metric for interactions by the second subset of client device with the second content element prior to interacting with the first content element; and
display the graph element in a graphical user interface overlaid on the information resource including the first content element and the second content element.

12. The system of claim 11, wherein the computing device is configured to receive, via a network interface, from a log database, an interaction dataset for the information resource including the first content element and the second content element, the interaction dataset including:
a first number of interactions by a plurality of client devices with the first content element prior to interacting with the second content element, the plurality of client devices including the first subset of client devices and the second subset of client device,
a second number of interactions by the plurality of client devices with the second content element prior to interacting with the first content element,
a first time duration for interacting with the first content element by each of the plurality of client devices, and
a second time duration for interacting with the second content element by each of the plurality of client devices.

13. The system of claim 11, wherein the computing device is configured to:
calculate, using a clustering algorithm, a first similarity measure among the first subset of client devices from a plurality of client devices based on a first number of interactions with the first content element, a second number of interactions with the second content element, a first time duration for interacting with the first content element, and a second time duration for interacting with the second content element, the plurality of client devices including the first subset of client devices and the second subset of client devices;
calculate, using the clustering algorithm, a second similarity measure among a second subset of client devices from the plurality of client devices based on the first number of interactions, the second number of interactions, the first time duration, and the second time duration;
identify, using the clustering algorithm, the first subset of client devices from the plurality of client devices based on the first similarity measure; and
identify, using the clustering algorithm, the second subset of client devices from the plurality of client devices based on the second similarity measure.

14. The system of claim 11, wherein the computing device is configured to:
calculate the first interaction sequence metric for interactions by the first subset of client devices with the first content element prior to interacting with the second content element on the information resource based on a corresponding first number of interactions and a corresponding first time interaction duration for the first subset of client devices;
calculate the second interaction sequence metric for interactions by the first subset of client devices with the second content element prior to interacting with the first content element on the information resource based on a corresponding second number of interactions and a corresponding second time interaction duration for the first subset of client devices;
calculate the third interaction sequence metric for interactions by the second subset of client devices with the first content element prior to interacting with the second content element on the information resource based on the corresponding first number of interactions and the corresponding first time interaction duration for the second subset of client devices;
calculate the fourth interaction sequence metric for interactions by the second subset of client devices with the second content element prior to interacting with the first content element on the information resource based on the corresponding second number of interactions and the corresponding second time interaction duration for the second subset of client devices;
determine the first interaction sequence difference measure based on the first interaction sequence metric and the third interaction sequence metric; and
determine the second interaction sequence difference measure based on the second interaction sequence metric and the fourth interaction sequence metric.

15. The system of claim 11, wherein the computing device is configured to:
calculate a first number of time intervals between the interactions by the first subset of client devices with the first content element prior to interacting with the second content element based on a corresponding first time duration for the first subset of client devices;
calculate a second number of time intervals between the interactions by the first subset of client devices with the second content element prior to interacting with the first content element based on a corresponding second time duration for the first subset of client devices;

wherein the graph element further includes:

a first directed loop from and to the first content element indicating the first number of time intervals between the interactions by the first subset of client devices with the first content element prior to interacting with the second content element; and a second directed loop from and to the second content element indicating the second number of time intervals between the interactions by the first subset of client devices with the second content element prior to interacting with the first content element.

16. The system of claim 11, wherein the computing device is further configured to:

set the first node to a first position in the graph element based on a position of the first content element within the information resource; and set the second node to a second position in the graph element based on a position of the second content element within the information resource.

17. The system of claim 11, wherein the computing device is further configured to display the graph element as an overlay interface element on the information resource with the first content element and the second content element.

18. The system of claim 11, wherein the computing device is further configured to:

compare a first number of interactions and a first time interaction duration on the first content element with a second number of interactions and a second time interaction duration on the second content element;

set the first node to a first visual property; and set the second node to a second visual property different from the first visual property, responsive to determining that the first number of interactions and the first time interaction duration is different from the second number of interactions and the second time interaction duration.

19. The system of claim 11, wherein the computing device is further configured to:

compare the first interaction sequence metric to the second interaction sequence metric;

set the first directed path to a first visual property; and set the second directed path to a second visual property different from the first visual property, responsive to determining that the first interaction sequence metric is different from the second interaction sequence metric by at least a predetermined margin.

20. The system of claim 11, wherein the computing device is further configured to:

insert a first descriptor element positioned on the first node corresponding to the first content element, the first descriptor element including a first identifier of the first content element; and insert a second descriptor element positioned on the second node corresponding to the second content element, the second descriptor element including a second identifier of the second content element.

* * * * *